US012663557B2

(12) United States Patent　　(10) Patent No.:　US 12,663,557 B2
Liu et al.　　(45) Date of Patent:　Jun. 23, 2026

(54) THREE-DIMENSIONAL UNWRAPPING PROCESSING METHOD AND SYSTEM FOR BOREHOLE TRANSIENT ELECTROMAGNETIC METHOD

(71) Applicant: ANHUI HUIZHOU GEOLOGY SECURITY INSTITUTE CO., LTD, Hefei (CN)

(72) Inventors: Huizhou Liu, Hefei (CN); Haoguo Chen, Hefei (CN); Ya Dong, Hefei (CN); Yubing Yang, Hefei (CN); Le Yang, Hefei (CN); Lingjun Wang, Hefei (CN); Weihao Sun, Hefei (CN)

(73) Assignee: ANHUI HUIZHOU GEOLOGY SECURITY INSTITUTE CO., LTD, Hefei (CN)

( * ) Notice: Subject to any disclaimer, the term of this patent is extended or adjusted under 35 U.S.C. 154(b) by 0 days.

(21) Appl. No.: 19/121,817

(22) PCT Filed: May 16, 2024

(86) PCT No.: PCT/CN2024/093639
§ 371 (c)(1),
(2) Date: Apr. 17, 2025

(87) PCT Pub. No.: WO2024/255521
PCT Pub. Date: Dec. 19, 2024

(65) Prior Publication Data
US 2026/0029555 A1　　Jan. 29, 2026

(30) Foreign Application Priority Data

Jun. 16, 2023　(CN) ......................... 202310716102.2

(51) Int. Cl.
| | |
|---|---|
| *G01V 3/38* | (2006.01) |
| *E21B 47/092* | (2012.01) |
| *G01V 3/28* | (2006.01) |

(52) U.S. Cl.
CPC .............. *G01V 3/38* (2013.01); *E21B 47/092* (2020.05); *G01V 3/28* (2013.01)

(58) Field of Classification Search
CPC ... G01V 3/00; G01V 3/18; G01V 3/26; G01V 3/28; G01V 3/38; E21B 47/00; E21B 47/09; E21B 47/092
(Continued)

(56) References Cited

U.S. PATENT DOCUMENTS

| | | | |
|---|---|---|---|
| 5,892,362 A | 4/1999 | Robison | |
| 6,891,370 B2 * | 5/2005 | Cline ............... | G01R 33/56563 |
| | | | 324/309 |

(Continued)

FOREIGN PATENT DOCUMENTS

| | | |
|---|---|---|
| AU | 2021101091 A4 | 5/2021 |
| CN | 104090306 A | 10/2014 |

(Continued)

OTHER PUBLICATIONS

S. K. Lee, et al., Underground and Down-Hole Transient Electromagnetic Modelling, 5th ASEG Conference, 1987, pp. 130-134.
(Continued)

*Primary Examiner* — Hoai-An D. Nguyen
(74) *Attorney, Agent, or Firm* — Bayramoglu Law Offices LLC

(57)　　　　ABSTRACT

A three-dimensional unwrapping processing method for a borehole transient electromagnetic method includes: acquiring measurement information of each measuring point in a target borehole, where the measurement information includes a secondary field induced electromotive force and
(Continued)

Acquire measurement information of each measuring point in a target borehole, where the measurement information includes a secondary field induced electromotive force and a roll angle ⟶ S10

Establish, for each measuring point, an unwrapped diagram with the roll angle as a horizontal coordinate and the secondary field induced electromotive force as a longitudinal coordinate ⟶ S20

Transform, when an electromotive force signal in the unwrapped diagram is a negative response, the electromotive force signal into a positive response according to a transformation equation of the roll angle to acquire measurement transformation information of each measuring point ⟶ S30 a roll angle; establishing, for each measuring point, an unwrapped diagram with the roll angle as a horizontal coordinate and the secondary field induced electromotive force as a longitudinal coordinate; and transforming, when an electromotive force signal in the unwrapped diagram is a negative response, the electromotive force signal into a positive response according to a transformation equation of the roll angle to acquire measurement transformation information. The processing problem of the borehole transient electromagnetic method in detecting a negative induced electromotive force response is solved, and the acquired measurement transformation information includes a negative electromotive force signal. A three-dimensional unwrapping processing system for a borehole transient electromagnetic method is also provided.

8 Claims, 19 Drawing Sheets

(58) Field of Classification Search
  USPC .......................... 324/323, 332, 334, 338, 339
  See application file for complete search history.

(56)             References Cited

U.S. PATENT DOCUMENTS 9,714,999 B1 * 7/2017 Nakai .............. G01R 33/56545

2002/0130663 A1    9/2002  Kuckes et al.
2020/0003928 A1    1/2020  Xue et al.

FOREIGN PATENT DOCUMENTS

| | | | | |
|---|---|---|---|---|
| CN | 106547031 A | 3/2017 | | |
| CN | 106772644 A | 5/2017 | | |
| CN | 106814403 A | 6/2017 | | |
| CN | 106970424 A | 7/2017 | | |
| CN | 107202550 A * | 9/2017 | ............. | G01B 11/24 |
| CN | 109209354 A | 1/2019 | | |
| CN | 112147707 A | 12/2020 | | |
| CN | 113341467 A | 9/2021 | | |
| CN | 115407412 A | 11/2022 | | |
| CN | 115586577 A | 1/2023 | | |
| CN | 116449442 A | 7/2023 | | |
| JP | 4250255 B2 * | 4/2009 | ............. | G01R 33/54 |
| WO | 2018107959 A1 | 6/2018 | | |

OTHER PUBLICATIONS

Wu Junjie, et al., Application of surface and borehole TEM joint exploration in 2 000 m deep mineral exploration, Coal Geology & Exploration, 2022, pp. 70-78, vol. 50 No.7.

Cao Yu, et al., Mine TEM 3D Observation Method and Application, Coal Geology of China, 2016, pp. 61-64, vol. 28 No. 07.

* cited by examiner

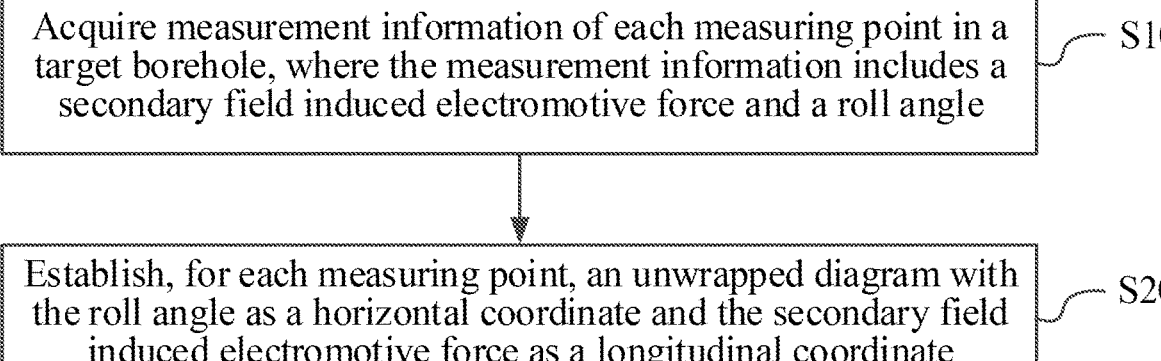

Acquire measurement information of each measuring point in a target borehole, where the measurement information includes a secondary field induced electromotive force and a roll angle — S10

Establish, for each measuring point, an unwrapped diagram with the roll angle as a horizontal coordinate and the secondary field induced electromotive force as a longitudinal coordinate — S20

Transform, when an electromotive force signal in the unwrapped diagram is a negative response, the electromotive force signal into a positive response according to a transformation equation of the roll angle to acquire measurement transformation information of each measuring point — S30

FIG. 1

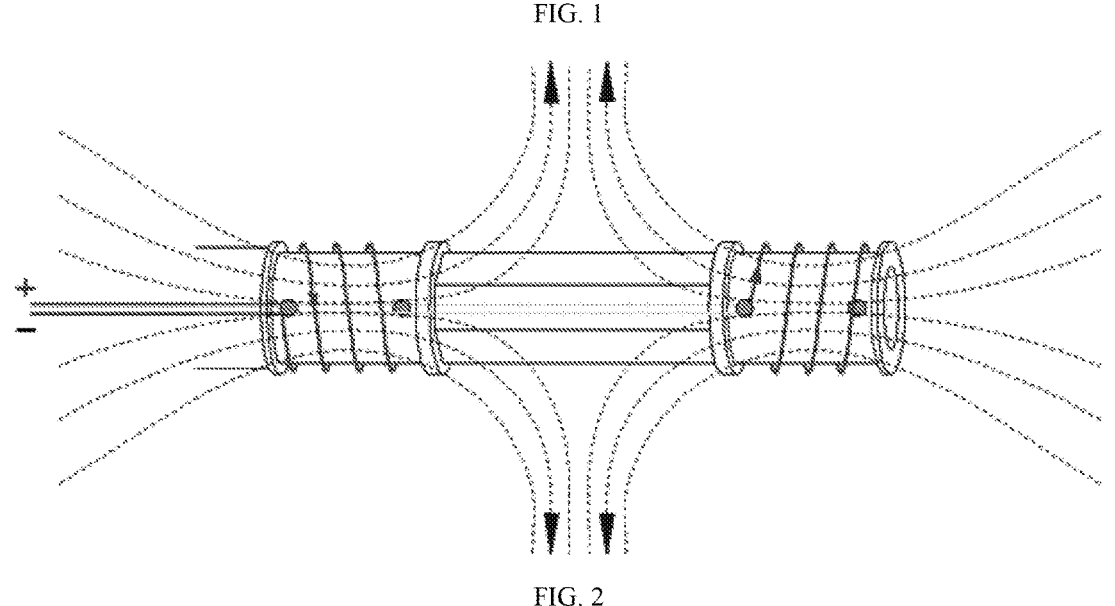

FIG. 2

Three measurements

Two measurements

One measurement (Reinforced concrete ground)
Anomalous region

THREE-DIMENSIONAL UNWRAPPING PROCESSING METHOD AND SYSTEM FOR BOREHOLE TRANSIENT ELECTROMAGNETIC METHOD

CROSS REFERENCE TO THE RELATED APPLICATIONS

This application is the national phase entry of International Application No. PCT/CN2024/093639, filed on May 16, 2024, which is based upon and claims priority to Chinese Patent Application No. 202310716102.2, filed on Jun. 16, 2023, the entire contents of which are incorporated herein by reference.

TECHNICAL FIELD

The present disclosure relates to the technical field of surveying, and in particular to a three-dimensional unwrapping processing method and system for a borehole transient electromagnetic method.

BACKGROUND

The borehole transient electromagnetic method is proposed based on traditional logging technology and a mine transient electromagnetic method. It combines the advantages of the traditional logging technology and the mine transient electromagnetic method to conduct all-direction transient electromagnetic detection in the limited space of a borehole, to achieve the goal of utilizing underground drilling in coal mines and understanding the lithology of the borehole, as well as water yield properties and structures around. Compared with the traditional transient electromagnetic method, when the mine transient electromagnetic method is used in the borehole to explore the geological conditions around the borehole, it mainly has the following three advantages. (1) The borehole transient electromagnetic detection method can avoid interference caused by metal support in tunnels and improve the signal-to-noise ratio (SNR) of transient electromagnetic signals. (2) The probe is sent into the borehole for detection, making it get closer to the anomalous body, achieving short distance to get anomalous information, low loss, small secondary field diffusion and high resolution. (3) The borehole transient electromagnetic method can detect water damage anomalies not exposed due to the "narrow view" of the borehole, expanding the control radius of the borehole and improving the utilization of the borehole.

However, there are still some technical issues existing in the prior detection technique based on the borehole transient electromagnetic method.

(1) Borehole detection involves a full space response. Due to the different orientations of the anomalous body relative to the probe, the response curve of the transient electromagnetic signal will vary, and even negative responses not conducive to the calculation of resistivity values may occur. In the related art, such as the method for detecting a radial water-bearing anomalous body in a coal mine borehole proposed in Chinese patent application CN104090306A, the process of locating the anomalous body cannot effectively utilize the negative response. (2) Only the approximate angle of the borehole where the anomalous body is located can be determined, and the distance between the anomalous body and the center of the borehole cannot be determined.

The above technical difficulties limit the scope and efficiency of the use of the borehole transient electromagnetic method.

SUMMARY

A technical problem to be solved by the present disclosure is how to utilize a three-dimensional unwrapping processing method to transform a negative response into effective information beneficial for calculating a resistivity value in a process of locating an anomalous body.

The present disclosure resolves the above problem through the following technical means: The present disclosure proposes a three-dimensional unwrapping processing method for a borehole transient electromagnetic method, including:

acquiring measurement information of each measuring point in a target borehole, where the measurement information includes a secondary field induced electromotive force and a roll angle;

establishing, for each measuring point, an unwrapped diagram with the roll angle as a horizontal coordinate and the secondary field induced electromotive force as a longitudinal coordinate; and transforming, when an electromotive force signal in the unwrapped diagram is a negative response, the electromotive force signal into a positive response according to a transformation equation of the roll angle to acquire measurement transformation information of each measuring point.

Furthermore, the acquiring measurement information of each measuring point in a target borehole includes:

conducting, in a process of moving a transient electromagnetic detection device into and/or out of the target borehole through a push rod, a point measurement according to a set step distance to acquire the measurement information of each measuring point.

Furthermore, the transient electromagnetic detection device is rotatably connected to the push rod, and the method further includes:

rotating, when the transient electromagnetic detection device is pushed or withdrawn to a certain measuring point through the push rod, the transient electromagnetic detection device by a specified angle to measure lateral information of the borehole at the measuring point.

Furthermore, before the acquiring measurement information of each measuring point in a target borehole, the method further includes:

establishing a first coordinate system with the roll angle $\gamma$ at $0°$, $90°$ on a right side and $-90°$ on a left side, and with the transient electromagnetic detection device vertically pointing upward to $0°$ and vertically pointing downward to $+-180°$;

setting a first receiving coil to be perpendicular to an axial direction of the transient electromagnetic detection device along a horizontal plane and to a right direction to face a positive direction of an X-axis of the first coordinate system, and setting a second receiving coil to be perpendicular to the horizontal plane and to an upward direction to face a positive direction of a Z-axis of the first coordinate system;

placing an iron object as a known anomalous body in any quadrant of the first coordinate system, and measuring an X-component induced electromotive force and a Z-component induced electromotive force through the first receiving coil and the second receiving coil, respectively; and adjusting, when the X-component induced electromotive force and/or the Z-component induced electromotive force do not match the quadrant, a direction of the X-component and/or a direction of the Z-component such that the direction of the induced electromotive force matches the quadrant.

Furthermore, the transforming, when an electromotive force signal in the unwrapped diagram is a negative response, the electromotive force signal into a positive response according to a transformation equation of the roll angle to acquire measurement transformation information of each measuring point includes:

when an electromotive force signal of a component in the unwrapped diagram is a negative response, transforming the roll angle to transform the electromotive force signal that is a negative response into a positive response, where the transformation equation of the roll angle is:

$$\text{when } 0° < \gamma < 180°, \gamma' = \gamma - 180°$$
$$\text{when } -180° < \gamma < 0°, \gamma' = 180° + \gamma$$

where, $\gamma$ denotes a measured roll angle, and $\gamma'$ denotes a transformed roll angle.

Furthermore, for processing an induced electromotive force signal that is a positive response, the method further includes:

dividing the induced electromotive force signal that is a positive response into a high-voltage region and a low-voltage region; and interpolating the high-voltage region and the low-voltage region separately, and smoothly connecting a plurality of measuring points within the corresponding region to form a plurality of channel curves.

Furthermore, after the transforming, when an electromotive force signal in the unwrapped diagram is a negative response, the electromotive force signal into a positive response according to a transformation equation of the roll angle to acquire measurement transformation information of each measuring point, the method further includes: determining an orientation and distance of the anomalous body based on the measurement transformation information of all measuring points, including:

forming, based on the measurement transformation information of all the measuring points, three-dimensional electromotive force data centered on the borehole; and determining, based on the three-dimensional electromotive force data, the orientation and distance of the anomalous body.

Furthermore, the forming, based on the measurement transformation information of all the measuring points, three-dimensional electromotive force data centered on the borehole includes:

establishing a second coordinate system by defining an X-axis, a Y-axis, and a Z-axis in a first coordinate system as a transformed roll angle $\gamma'$, a hole depth or actual drilling footage, and an induced electromotive force value, respectively; and combining, in the second coordinate system, the measurement transformation information of all the measuring points along a depth direction of the target borehole at a set interval to acquire the three-dimensional electromotive force data of the target borehole unwrapped based on the roll angle.

Furthermore, the determining, based on the three-dimensional electromotive force data, the orientation and distance of the anomalous body includes:

processing, based on a known resistivity calculation method, the three-dimensional electromotive force data to acquire two-dimensional and three-dimensional spatial distributions of resistivity for all the measuring points, and calculating a three-dimensional resistivity data volume centered on the borehole;

extracting a two-dimensional resistivity value profile from the three-dimensional resistivity data volume at any specified roll angle; and determining, based on the two-dimensional resistivity value profile, a geological condition of the target borehole at any specified orientation and any specified distance.

In addition, the present disclosure further proposes a three-dimensional unwrapping processing system for a borehole transient electromagnetic method, including:

an acquisition module, configured to acquire measurement information of each measuring point in a target borehole, where the measurement information includes a secondary field induced electromotive force and a roll angle;

an unwrapped diagram establishment module, configured to establish, for each measuring point, an unwrapped diagram with the roll angle as a horizontal coordinate and the secondary field induced electromotive force as a longitudinal coordinate; and an electromotive force transformation module, configured to transform, when an electromotive force signal in the unwrapped diagram is a negative response, the electromotive force signal into a positive response according to a transformation equation of the roll angle to acquire measurement transformation information of each measuring point.

Furthermore, the system further includes a calibration module, including:

a first coordinate system establishment unit, configured to establish a first coordinate system with the roll angle $\gamma$ at 0°, 90° on a right side and -90° on a left side, and with the transient electromagnetic detection device vertically pointing upward to 0° and vertically pointing downward to +−180°;

a setting unit, configured to set a first receiving coil to be perpendicular to an axial direction of the transient electromagnetic detection device along a horizontal plane and to a right direction to face a positive direction of an X-axis of the first coordinate system, and set a second receiving coil to be perpendicular to the horizontal plane and to an upward direction to face a positive direction of a Z-axis of the first coordinate system;

a measurement unit, configured to place an iron object as a known anomalous body in any quadrant of the first coordinate system, and measure an X-component induced electromotive force and a Z-component induced electromotive force through the first receiving coil and the second receiving coil, respectively; and a calibration unit, configured to adjust, when the X-component induced electromotive force and/or the Z-component induced electromotive force do not match the quadrant, a direction of the X-component and/or a direction of the Z-component to match the quadrant.

The present disclosure has the following advantages:

(1) In the present disclosure, based on the measurement information of each measuring point inside the borehole, the horizontal axis of the original measurement signal takes time and the vertical axis thereof takes the secondary field induced electromotive force. That is, the unwrapped diagram is established with the roll angle as the horizontal coordinate and the secondary field induced electromotive force as the longitudinal coordinate. When an electromotive force signal in the unwrapped diagram is a negative response, the electromotive force signal is transformed into effective information that is beneficial for calculating the resistivity value, namely, a positive response, according to the roll angle transformation equation. In this way, based on the electromotive force signals from all the measuring points, the orientation and distance of the anomalous body can be determined.

(2) In the present disclosure, the negative electromotive force signal is transformed into a positive electromotive force signal, which is combined with an originally positive electromotive force signal to determine the orientation of the anomalous body and the distance from the detection device. By unwrapping the borehole based on the roll angle, the present disclosure fundamentally solves the problem of detecting a negative induced electromotive force response through the borehole transient electromagnetic method. By fully and effectively utilizing the negative electromotive force signal, the present disclosure improves the accuracy of anomalous body positioning and solves the technical problem of inaccurate abnormal orientation positioning caused by full space response.

(3) The present disclosure first calibrates the detection device before acquiring measurement information of each measuring point in the target borehole to ensure that the detection device can accurately acquire measurement information of each measuring point.

The additional aspects and advantages of the present disclosure are partially provided in the following descriptions, and this part will become apparent from the following descriptions, or may be learned from the practice of the present disclosure.

BRIEF DESCRIPTION OF THE DRAWINGS

FIG. 1 is a flowchart of a three-dimensional unwrapping processing method for a borehole transient electromagnetic method according to an embodiment of the present disclosure;

FIG. 2 is a structural schematic diagram of a dual transmitting coil according to an embodiment of the present disclosure;

DETAILED DESCRIPTION OF THE EMBODIMENTS

Figure 3:
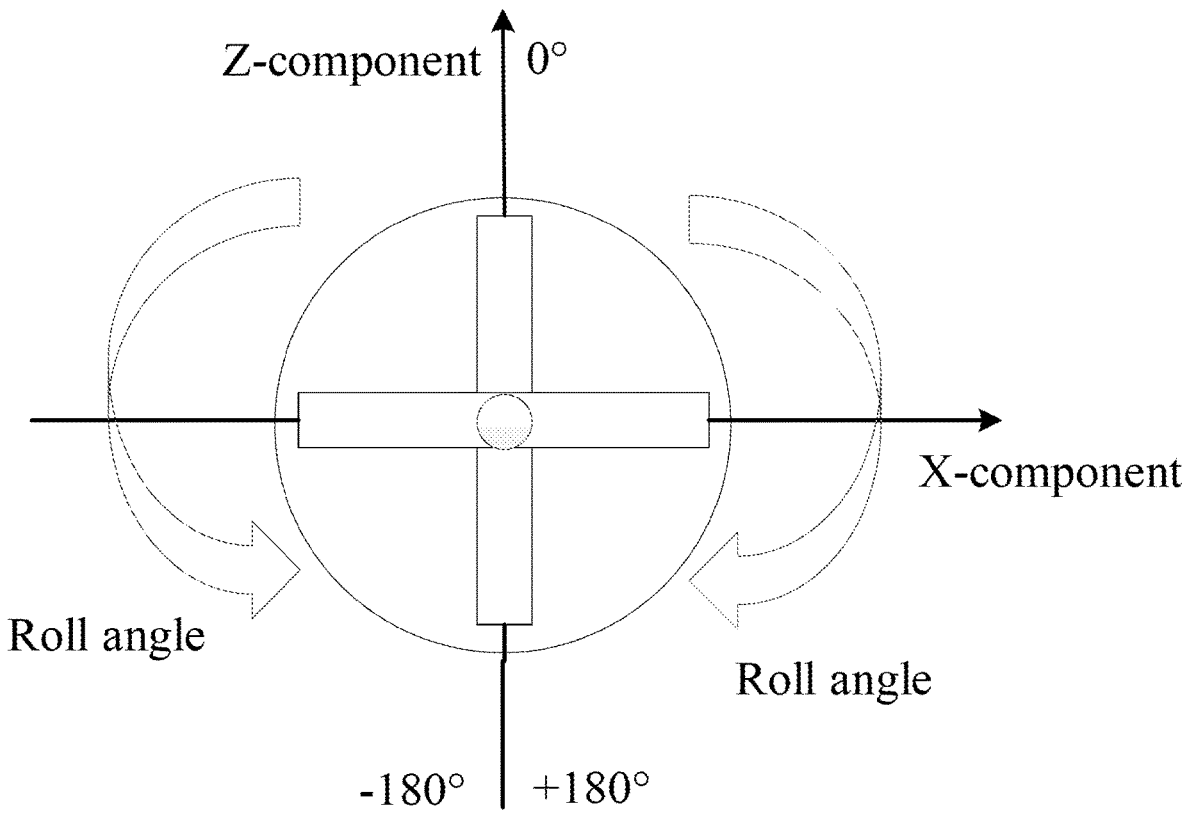
FIG. 3 is a front view of a detection device entering into a borehole as a whole according to an embodiment of the present disclosure.

In order to make the objectives, technical solutions, and advantages of the embodiments of the present disclosure clearer, the following clearly and completely describes the technical solutions in the embodiments of the present disclosure with reference to the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

As shown in FIG. 1, a first embodiment of the present disclosure proposes a three-dimensional unwrapping processing method for a borehole transient electromagnetic method, including the following steps.

S10. Measurement information of each measuring point in a target borehole is acquired, where the measurement information includes a secondary field induced electromotive force and a roll angle.

S20. For each measuring point, an unwrapped diagram is established with the roll angle as a horizontal coordinate and the secondary field induced electromotive force as a longitudinal coordinate.

S30. When an electromotive force signal in the unwrapped diagram is a negative response, the electromotive force signal is transformed into a positive response according to a transformation equation of the roll angle to acquire measurement transformation information of each measuring point.

In this embodiment, the transient electromagnetic detection device is used to achieve the measurement of each measuring point inside the target borehole. Based on the measurement information of each measuring point inside the borehole, the unwrapped diagram is established by taking the roll angle as the horizontal coordinate and the secondary field induced electromotive force as the longitudinal coordinate. When an electromotive force signal in the unwrapped diagram is a negative response, the electromotive force signal is transformed into a positive response according to the roll angle transformation equation. In this way, based on the electromotive force signals from all the measuring points, the orientation and distance of the anomalous body can be determined.

In this embodiment, a push rod and a transient electromagnetic detection device are used to acquire information from various measuring points inside the target borehole. The transient electromagnetic detection device is rotatably connected to the push rod. The transient electromagnetic detection device includes a dual transmitting coil, a roll angle measuring component, a borehole transient acquisition component, and at least two receiving coils. There is an angle between the two receiving coils. The dual transmitting coil is connected to a transmitter, and the receiving coils are connected to a receiver.

The roll angle measuring component can use an inclinometer or electronic compass, and the borehole transient acquisition component can use an analog-to-digital (AD) acquisition device. Specifically, the transient electromagnetic detection device is threaded to the push rod.

Specifically, the structure of the dual transmitting coil is shown in FIG. 2. The dual transmitting coil includes two coaxial transmitting coils placed inside a cylinder and passed with reverse currents. In the figure, the solid line denotes routing of the dual transmitting coil, and the solid arrow denotes the direction of current flow. According to the right-hand helix law, the transmitting coil forms a magnetic field shown by the dashed line, with the dashed arrow indicating the direction of a magnetic field line. Equivalently, in the dual transmitting coil, there is a magnetic field source similar to a point power source at a center of the cylinder emitting a primary field in a radial direction of the borehole.

In related art, the emitter is placed at the opening of the borehole. In contrast, in this embodiment, the transient electromagnetic detection device has a cylindrical shape as a whole and is rotatably connected to the push rod. To conduct point measurements, the push rod sends the transient electromagnetic measurement device into the borehole, and point measurements are conducted when the transient electromagnetic measurement device enters and/or exits the borehole.

FIG. 3 is a front view of the entire device after entering the borehole. The first coordinate system is established with the roll angle γ at 0°, 90° on a right side and −90° on a left side, and with the transient electromagnetic detection device vertically pointing upward to 0° and vertically pointing downward to +−180°.

Among the two receiving coils, a first receiving coil is configured to measure an X-component of the induced electromotive force. The first receiving coil is perpendicular to the axial direction of the device along the horizontal plane and oriented to the right to face a positive direction. The second receiving coil is configured to measure a Z-component of the induced electromotive force. It is perpendicular to the horizontal plane and oriented to an upward direction to face a positive direction.

In an embodiment, the step S10 that the measurement information of each measuring point in the target borehole is acquired is specifically implemented as follows.

In a process of moving a transient electromagnetic detection device into and/or out of the target borehole through a push rod, a point measurement is conducted according to a set step distance to acquire the measurement information of each measuring point.

It should be noted that in this embodiment, to measure at the measuring points, a probe is sent into the target borehole until it reaches the bottom of the borehole, point measurements are conducted according to certain drilling footage. Alternatively, when the probe exits the borehole, point measurements are conducted according to a certain retreating footage. Alternatively, when the probe enters and exits the target borehole, measurements at the measuring points are conducted at certain intervals. By increasing the number of acquisition data points, the detection accuracy can be improved.

It should be understood that the drilling footage used during the process of inserting the probe into the target borehole and the retreating footage used during the process of withdrawing the probe from the target borehole can be the same or different.

In an embodiment, in the step S10 that the measurement information of each measuring point in the target borehole is acquired further includes the following step. When the transient electromagnetic detection device is pushed to a certain measuring point through the push rod, the transient electromagnetic detection device is rotated to measure lateral information of the borehole at the measuring point.

Figure 4:
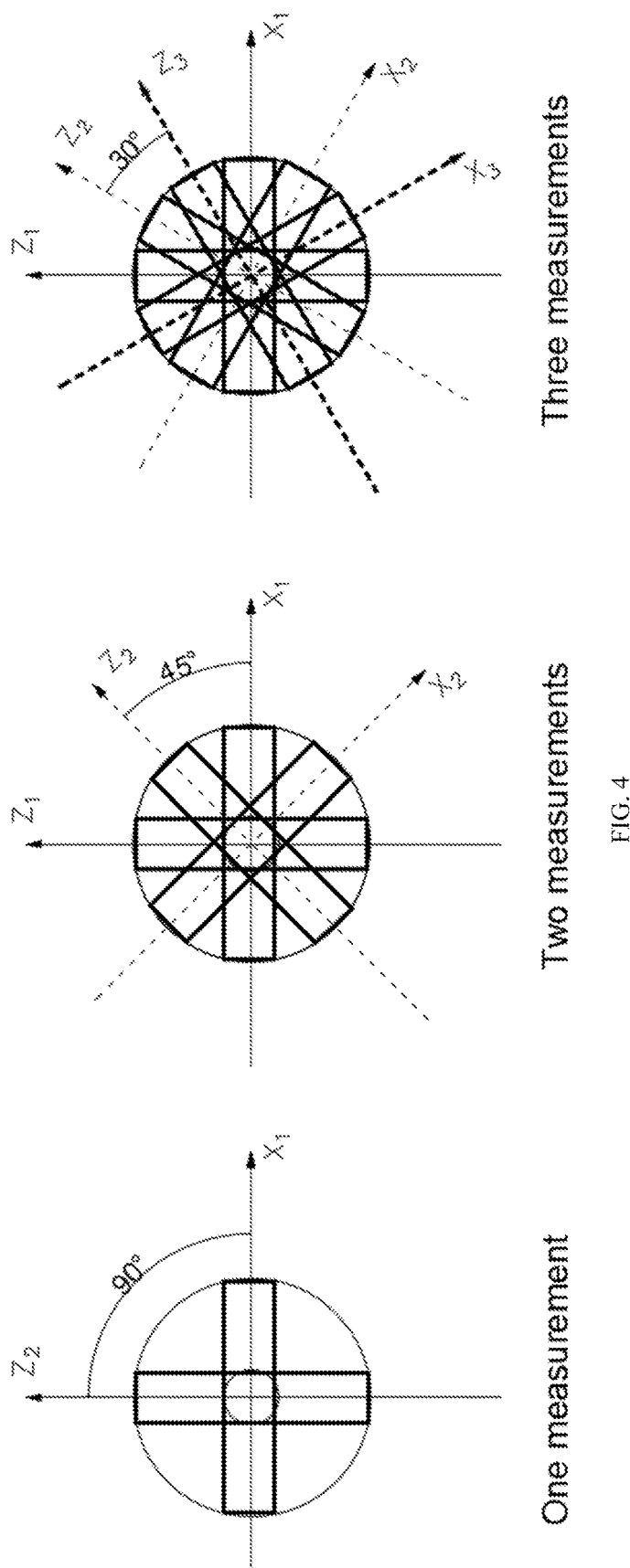
FIG. 4 is a vector decomposition diagram with a detection accuracy corresponding to a number of detections according to an embodiment of the present disclosure.

In this embodiment, by rotating the transient electromagnetic detection device, a plurality of measurements can be conducted at the same measuring point to improve lateral resolution and ensure detection accuracy. As shown in FIG. 4, through a vector diagram analysis, it can be concluded that two measurement values are acquired through one measurement, and the abnormal orientation can be controlled within 90°. Thus, four measurement values can be acquired through two measurements, and the abnormal orientation can be controlled within 45°. As for three measurements conducted, the abnormal orientation can be controlled within 30°. When n rotations of measurements are needed, 2n measuring points appear radially, and In measuring points in the axial direction can be directly stacked to form one measuring point. The radial 2n points need to be expressed using vector decomposition and forward modeling. Meanwhile, it is advisable to use 45° for double measurements and 30° for triple measurements, which means the optimal rotation angle for n measurements is $\beta=90/n$.

In an embodiment, before the step S10 that the measurement information of each measuring point in the target borehole is acquired, the method further includes the following step. A first coordinate system is established with the roll angle γ at 0°, 90° on a right side and −90° on a left side, and with the transient electromagnetic detection device vertically pointing upward to 0° and vertically pointing downward to +−180°.

A first receiving coil is set to be perpendicular to an axial direction of the transient electromagnetic detection device along a horizontal plane and to a right direction to face a positive direction of an X-axis of the first coordinate system, and a second receiving coil is set to be perpendicular to the horizontal plane and to an upward direction to face a positive direction of a Z-axis of the first coordinate system.

An iron object as a known anomalous body is placed in any quadrant of the first coordinate system, and an X-component induced electromotive force and a Z-component induced electromotive force are measured through the first receiving coil and the second receiving coil, respectively.

When the X-component induced electromotive force and/or the Z-component induced electromotive force do not match the quadrant, a direction of the X-component and/or a direction of the Z-component is adjusted to match the quadrant.

It should be noted that if the iron object is placed in the first quadrant as a known anomalous body, the induced electromotive force values of the two components measured are positive. If they are not both positive, the direction of the negative electromotive force component is adjusted. When the iron object is placed as a known anomaly in the third quadrant, if the induced electromotive force values of the components measured are negative but the actual measurement results are not both negative, both induced electromotive force components are adjusted to be negative.

Preferably, in this embodiment, the iron object is placed in the first or third quadrant to calibrate the detection device, thereby resulting in the best effect.

In an embodiment, the step S30 that when an electromotive force signal in the unwrapped diagram is a negative response, the electromotive force signal is transformed into a positive response according to a transformation equation of the roll angle to acquire measurement transformation information of each measuring point includes the following step.

When an electromotive force signal of a component in the unwrapped diagram is a negative response, the roll angle is transformed, thereby transforming the electromotive force signal that is a negative response into a positive response, where the transformation equation of the roll angle is:

$$\text{when } 0° < γ < 180°, γ' = γ − 180°$$

$$\text{when } −180° < γ < 0°, γ' = 180° + γ$$

where, γ denotes a measured roll angle, and γ' denotes a transformed roll angle.

Figure 5:
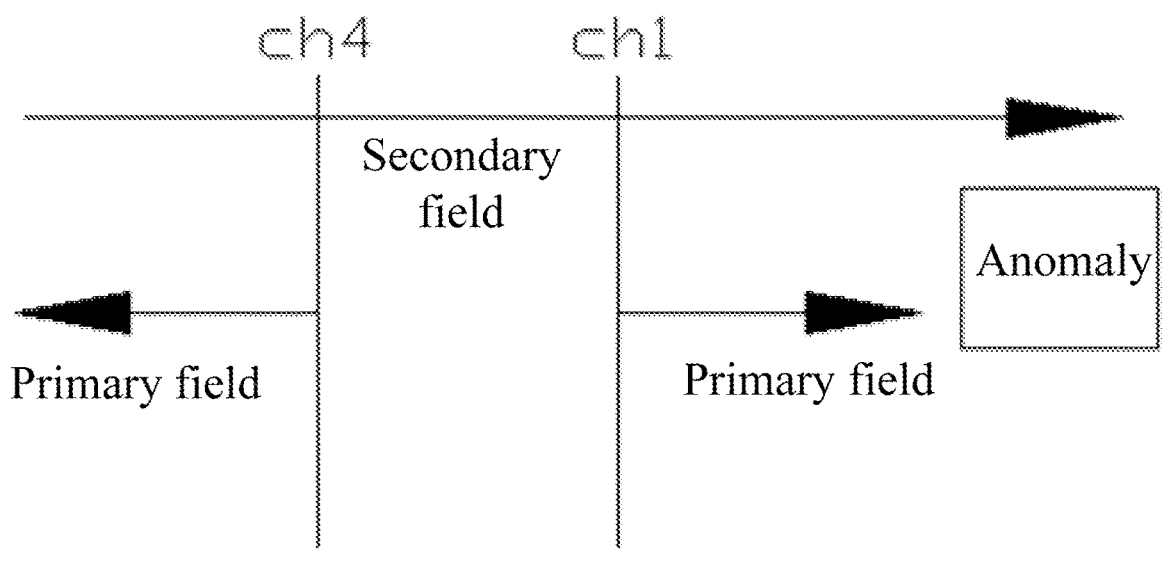
FIG. 5 is a schematic diagram of a cause and transformation of a negative response signal occurring in a borehole transient electromagnetic method according to an embodiment of the present disclosure.

Specifically, the reason and transformation process of the negative response signal appearing in the borehole transient measurement are as follows. The direction of the primary magnetic field is radial. In an emission interval, according to Lenz's law, the secondary magnetic field induced by the low-resistivity anomalous body will hinder the disappearance of the primary magnetic field. For example, in FIG. 5, ch1 is facing the anomalous body. In order to hinder the disappearance of the primary magnetic field, a secondary magnetic field will inevitably be produced in the same direction as the primary magnetic field. In fact, ch1 and ch4 are in the same direction, so only one channel (such as the X-component channel or Z-component channel) is needed. Because the coil has a direction, according to a prior agreement, the right direction is defined as positive. Therefore, in the anomaly shown in FIG. 5, the measured induced electromotive force is positive. If the anomaly is at a different side, the measured induced electromotive force is negative. A second coordinate system is established by taking γ' as the horizontal coordinate of the unwrapped diagram and the induced electromotive force as the longitudinal coordinate of the unwrapped diagram. By replacing the negative induced electromotive force with γ' in the unwrapped diagram, the negative value becomes positive (vector relationship) and is placed in the unwrapped diagram.

For example, when the anomalous body is located on the positive axis of the Z-component and the positive axis of the X-component, the secondary field induced electromotive force curve is positive. When the anomalous body is located on the negative axis, the secondary field induced electromotive force curve is negative. To ensure that the signal is positive, the signal is transformed based on the measured roll angle γ according to the following transformation method.

When the induced electromotive force signal is positive, the transformed roll angle γ' is equal to the actual roll angle γ. When the induced electromotive force signal is negative, taking a negative X-component induced electromotive force as an example, the transformed roll angle γ' is acquired according to the transformation equation for the roll angle.

It should be understood that the signal transformation process is the same in case the Z-component induced electromotive force is negative.

It should be noted that the signal acquired by the transient electromagnetic method is an attenuation curve of the secondary field signal over time, while the secondary field signal acquired by the borehole transient electromagnetic device shows positive or negative values depending on the different abnormal orientations. According to the attenuation curve, a time point is artificially specified, and based on this point, the negative value to be transformed takes its absolute value and is transformed into a positive signal at a corresponding position according to the roll angle equation.

It should be noted that in a traditional time-domain transient electromagnetic method, the measurement information of a single measuring point can be reflected by the attenuation of the induced electromotive force values of a plurality of channel points over time. The plurality of channel curves between the plurality of measuring points are formed based on linear interpolation (different measuring points have the same time at the same channel point, but have different measured induced electromotive force values). In the unwrapped diagram, after the information of a certain measuring point is unwrapped based on the roll angle of the borehole, the measurement information of each roll angle can be reflected by the attenuation of the induced electromotive forces of a plurality of channel points over time, and the plurality of channel curves between different roll angles are formed by linear interpolation.

In an embodiment, for an induced electromotive force signal that is a positive response, the method further includes the following step.

The induced electromotive force signal that is a positive response is divided into a high-voltage region and a low-voltage region.

The high-voltage region and the low-voltage region are interpolated separately, and a plurality of measuring points within the corresponding region are smoothly connected to form a plurality of channel curves.

It should be noted that here, the induced electromotive force signal of the positive response includes an induced electromotive force signal being a positive response itself or an induced electromotive force of a positive response transformed from an induced electromotive force of a negative response.

It should be noted that it can be artificially defined that the low voltage region corresponds to an overall induced electromotive force value of the secondary field that is below 10 $\mu V$ and the high voltage region corresponds to an overall induced electromotive force value of the secondary field that is greater than or equal to 10 $\mu V$.

Figure 6:
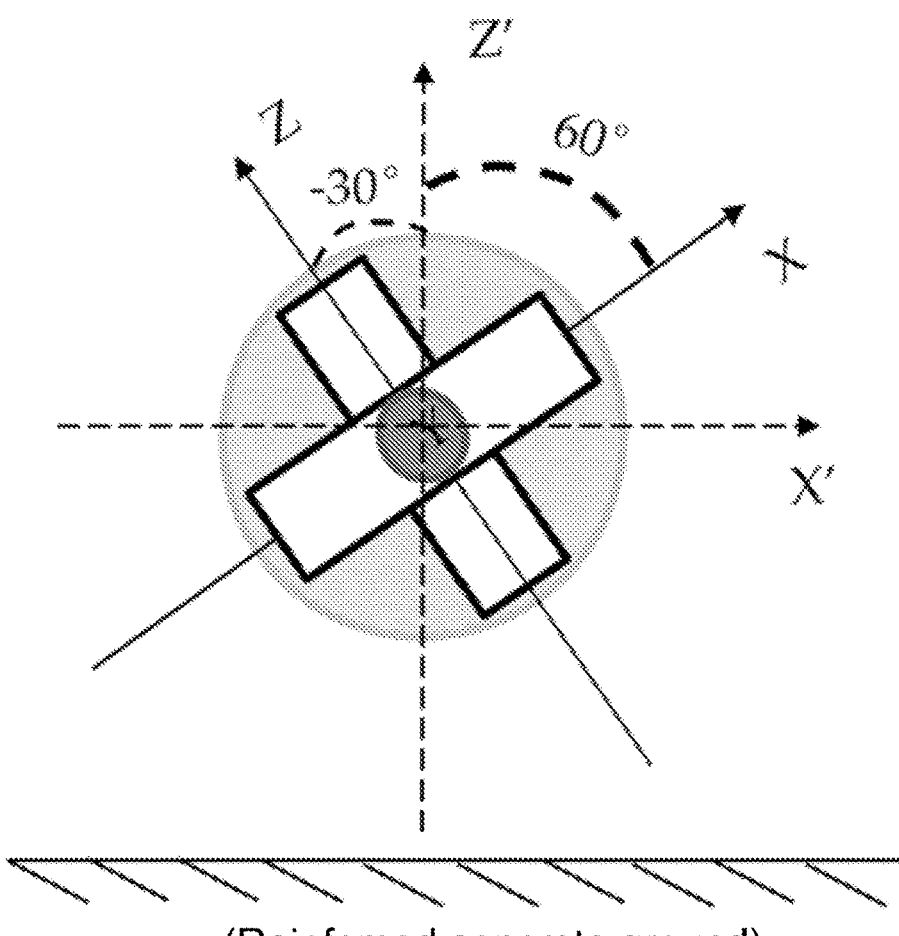
FIG. 6 is a schematic diagram of an actual measurement according to an embodiment of the present disclosure.

Specifically, as shown in FIG. 6, when the borehole transient electromagnetic device is placed on a reinforced concrete ground for detection, the values of the two components (Z, X) can be acquired through one measurement. At this point, the measured response curves of the Z- and X-components correspond to negative secondary fields.

Figure 7:
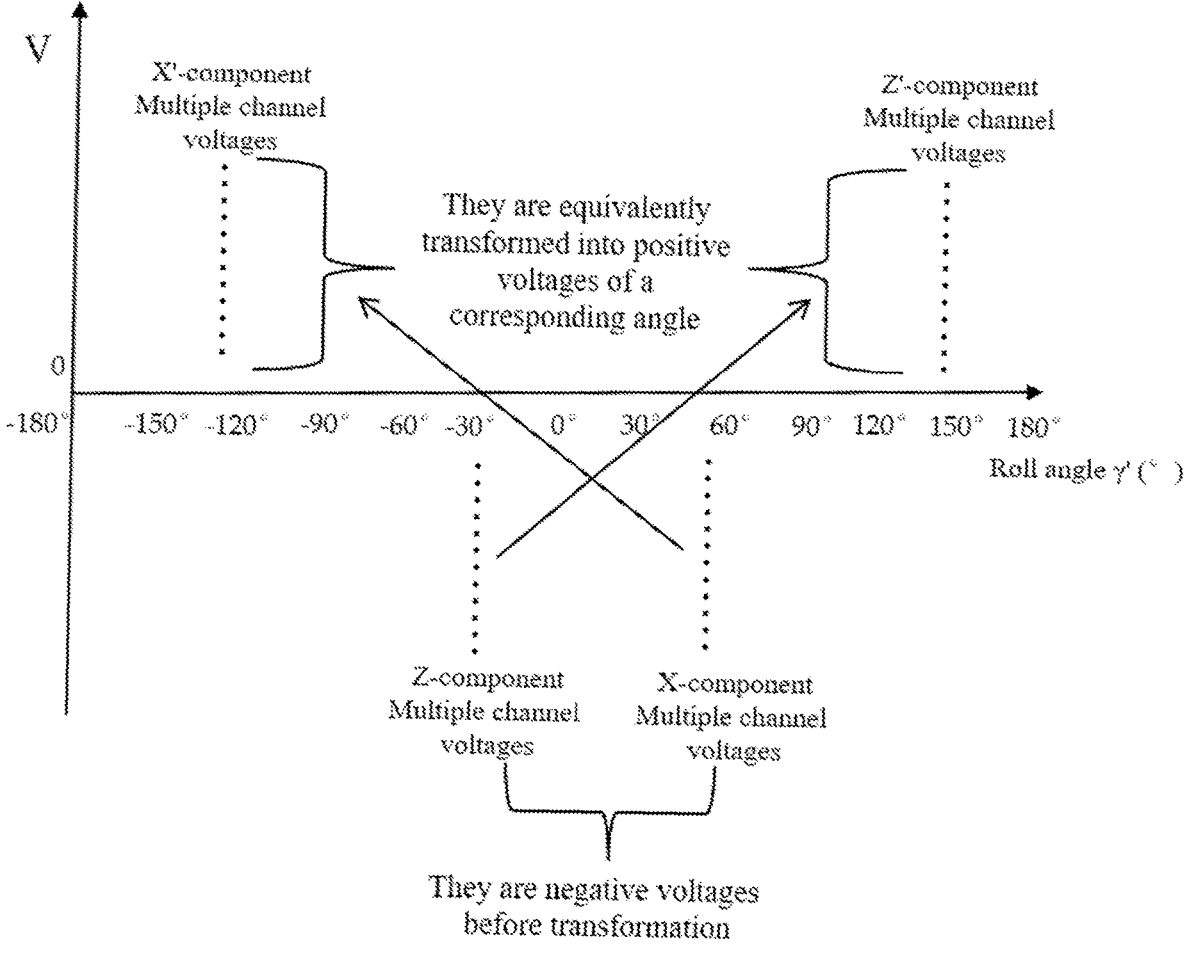
FIG. 7 is a schematic diagram of transforming a negative signal based on a roll angle according to an embodiment of the present disclosure.

As shown in FIG. 7, when the anomaly is located on the negative axis, the corresponding induced electromotive force is negative. To transform the negative values into positive values, the $-30°$ induced electromotive force of the Z-component can be equivalent to the $150°$ one of the Z-component, and the $60°$ induced electromotive force of the X-component can be equivalent to the $-120°$ one of the X-component.

Figure 8:
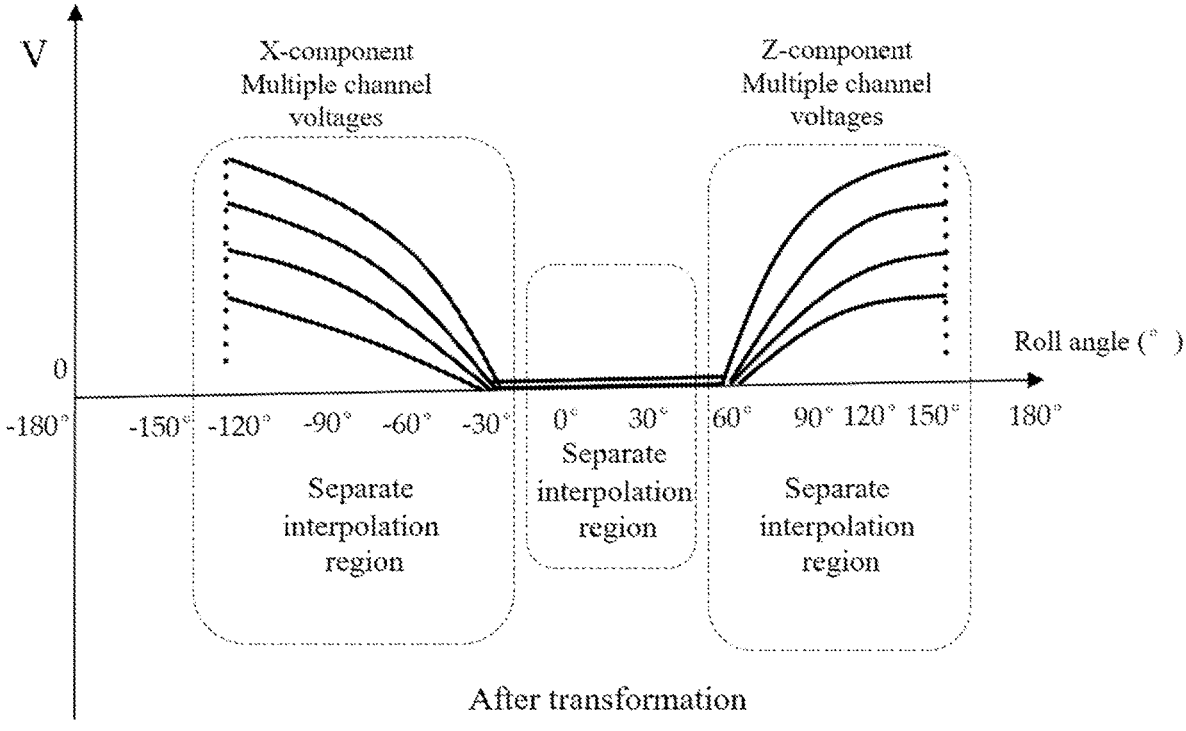
FIG. 8 is a schematic diagram of an interpolation principle according to an embodiment of the present disclosure.

Therefore, negative induced electromotive forces of points can be equivalently transformed into positive values of corresponding angles through the roll angle. An originally negative angle can be artificially set as a low-voltage (high-resistivity) point. For a positive induced electromotive force, a plurality of measuring points are smoothly connected through interpolation to form a plurality of channel curves. During specific interpolation, separate interpolation operations are performed on the high- and low-voltage regions, as shown in FIG. 8.

In an embodiment, after the step S30 that when an electromotive force signal in the unwrapped diagram is a negative response, the electromotive force signal is transformed into a positive response according to a transformation equation of the roll angle to acquire measurement transformation information of each measuring point, the method further includes the following step.

S40. Based on the measurement transformation information of all the measuring points, the orientation and distance of the anomalous body are determined.

The step S40 that based on the measurement transformation information of all the measuring points, the orientation and distance of the anomalous body are determined specifically includes the following steps.

S41. Based on the measurement transformation information of all the measuring points, three-dimensional electromotive force data centered on the borehole is formed.

S42. Based on the three-dimensional electromotive force data, the orientation and distance of the anomalous body are determined.

In this embodiment, the negative electromotive force signal is transformed into a positive electromotive force signal, which is combined with an originally positive electromotive force signal to determine the orientation of the anomalous body and the distance from the detection device. By unwrapping the borehole based on the roll angle, the present disclosure fundamentally solves the problem of detecting a negative induced electromotive force response through the borehole transient electromagnetic method. By fully and effectively utilizing the negative electromotive force signal, the present disclosure improves the accuracy of anomalous body positioning and solves the technical problem of inaccurate abnormal orientation positioning caused by full space response.

In an embodiment, the step S41 that based on the measurement transformation information of all the measuring points, the three-dimensional electromotive force data centered on the borehole is formed includes the following step. A second coordinate system is established by defining an X-axis, a Y-axis, and a Z-axis in a first coordinate system as a transformed roll angle $\gamma'$, a hole depth or actual drilling footage, and an induced electromotive force value, respectively.

In the second coordinate system, the measurement transformation information of all the measuring points is combined along a depth direction of the target borehole at a set interval to acquire the three-dimensional electromotive force data of the target borehole unwrapped based on the roll angle.

It should be noted that for the same measuring point, only when two measuring points of the X- and Z-components are measured at one time, the anomalous interpolation pattern is processed using a 4-quadrant method. When there are 4 measuring points for 2 measurements, linear interpolation is used. It is more convenient to operate when there are more than 4 measuring points.

For further illustration, 5 typical measurement examples are described below. For the convenience of drawing, the plurality of channel curves in the figure are indicated by a thick solid line. In the unwrapped diagram involved, the solid thin arrow represents the actual positive value of the measuring point and does not require any transformation. The dashed arrow represents the actual negative value of the measuring point and requires transformation according to the above roll angle transformation equation. The solid bold arrow represents the position and magnitude of the corresponding positive value calculated according to the roll angle transformation equation.

Figure 9:
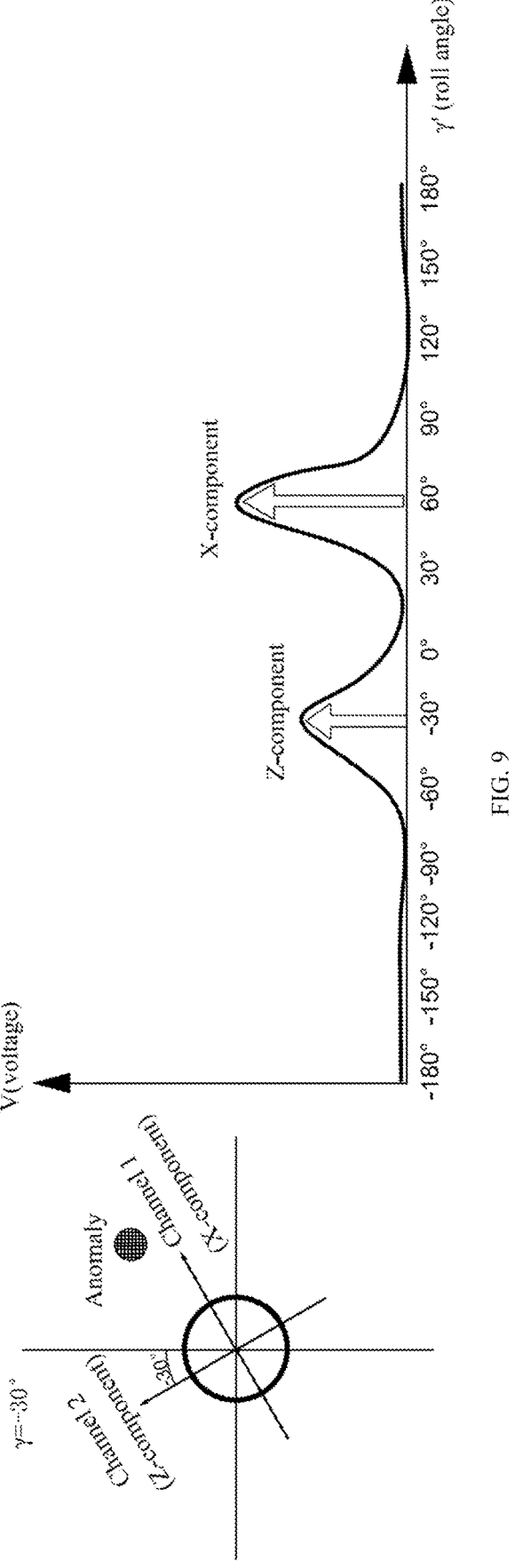
FIG. 9 is a diagram of an original induced electromotive force curve pattern of a secondary field primitive at a first measuring point according to an embodiment of the present disclosure.

(1) First Measuring Point (the Anomalous Body is Located on the Positive Axes of the X- and Z-Components)
As shown in FIG. 9, the low-resistivity anomaly is located on the positive axes of the X- and Z-components, and the secondary field induced electromotive force curves are positive, and the transformed roll angle $\gamma'$ is equal to the actual roll angle $\gamma$.

Figure 10:
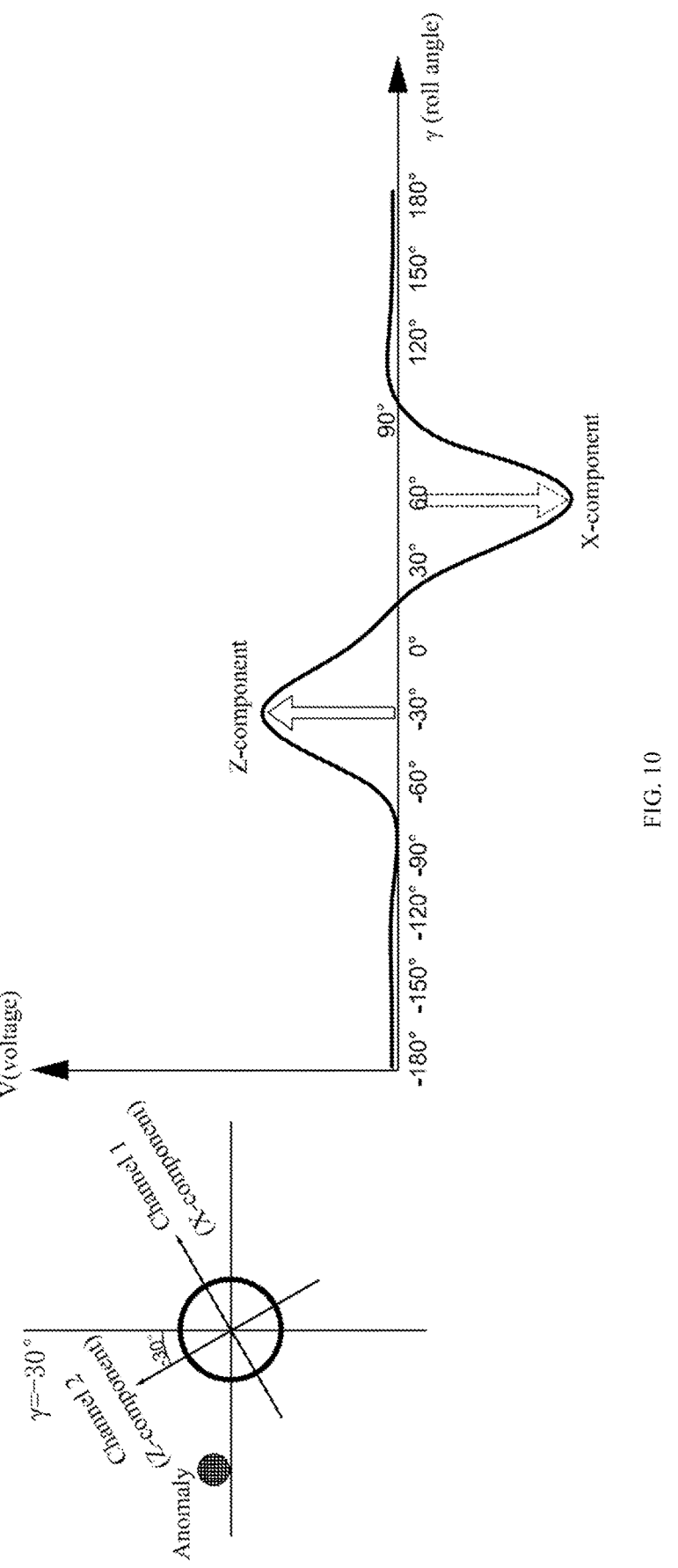
FIG. 10 is a diagram of an original induced electromotive force curve pattern of a secondary field at a second measuring point according to an embodiment of the present disclosure.
Figure 11:
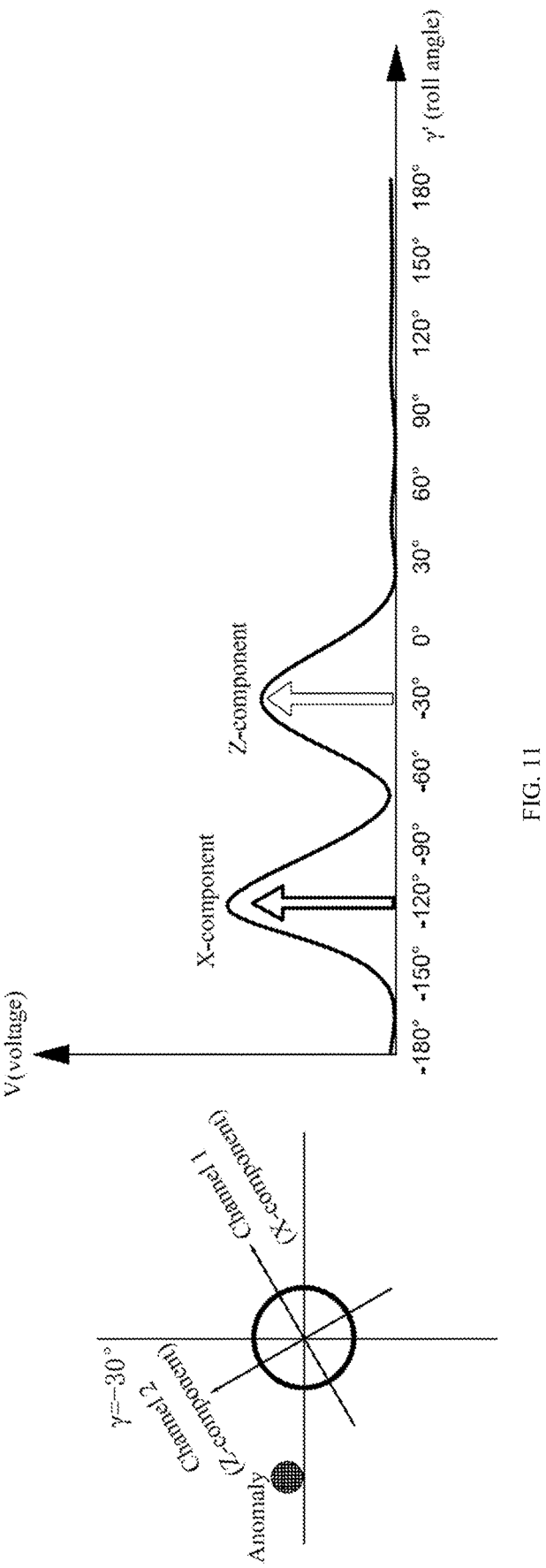
FIG. 11 is an unwrapped diagram based on a transformed roll angle of the second measuring point according to an embodiment of the present disclosure.

(2) Second Measuring Point (the Anomaly is Located on the Negative Axis of the X-Component and the Positive Axis of the Z-Component)
The anomaly is located on the negative axis of the X-component and the positive axis of the Z-component, and the corresponding pattern of the original induced electromotive force curve of the secondary field is shown in FIG. 10. In this case, the measured signal of the X-component is negative, and the roll angle is $\gamma=-30°$. According to the roll angle transformation equation, the transformed roll angle is $\gamma'=-30°+180°=150°$. The measured signal of the Z-component is positive and does not require any transformation. The unwrapped diagram based on the transformed roll angle is shown in FIG. 11.

Figure 12:
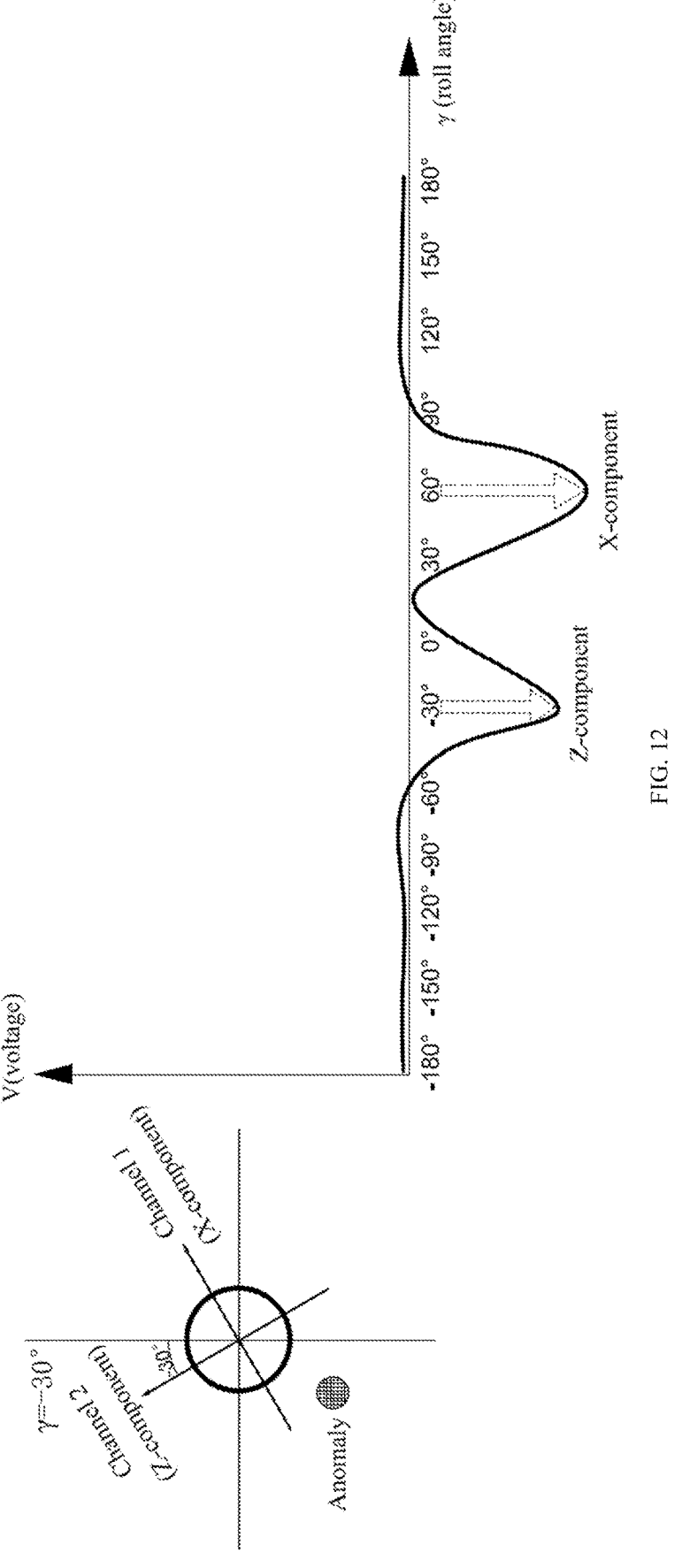
FIG. 12 is a diagram of an original induced electromotive force curve pattern of a secondary field at a third measuring point according to an embodiment of the present disclosure.
Figure 13:
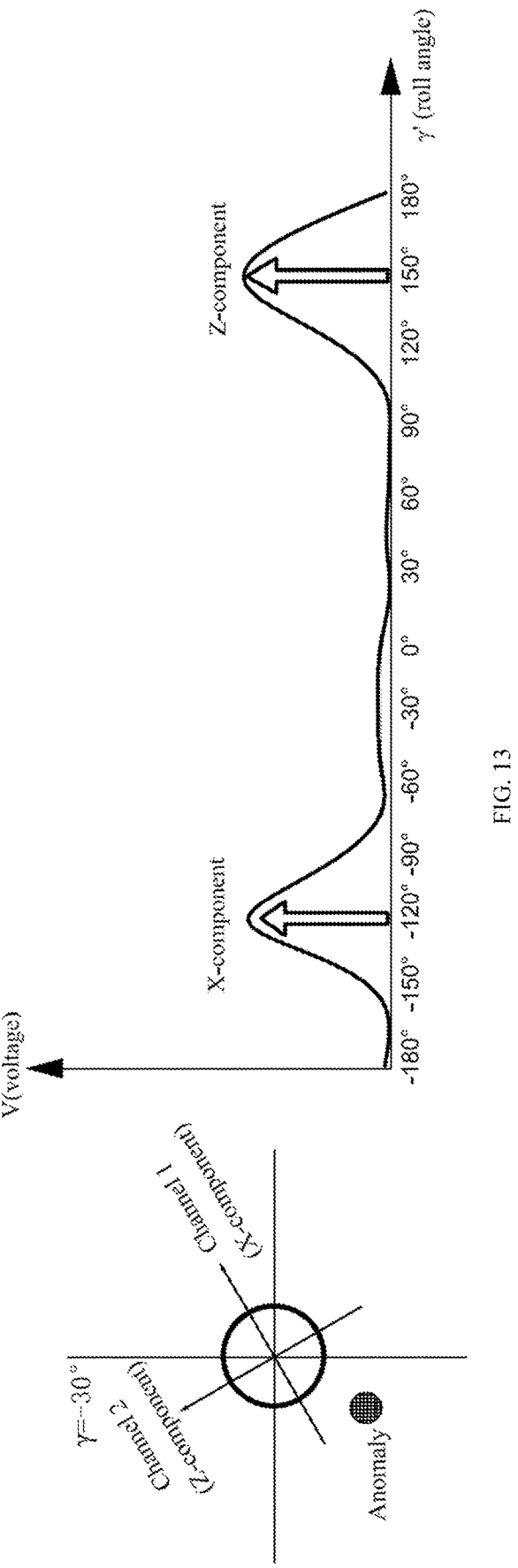
FIG. 13 is an unwrapped diagram based on a transformed roll angle of the third measuring point according to an embodiment of the present disclosure.

(3) Third Measuring Point (the Anomaly is Located on the Negative Axes of the X- and Z-Components)
When the anomaly is located on the negative axis of the X- and Z-components, the corresponding pattern of the original induced electromotive force curve of the secondary field is shown in FIG. 12. In this case, both the measured signals of the X- and Z-components are negative, and the roll angle $\gamma$ is $-30°$. According to the roll angle transformation equation, the transformed roll angle $\gamma'$ of the X-component is $60°-180°=-120°$, and the roll angle $\gamma'$ of the Y-component is $-30°+180°=150°$. The unwrapped diagram based on the transformed roll angle is shown in FIG. 13.

(4) Fourth Measuring Point (the Anomaly is Located on the Positive Axis of the X-Component and the Negative Axis of the Z-Component)

Figure 14:
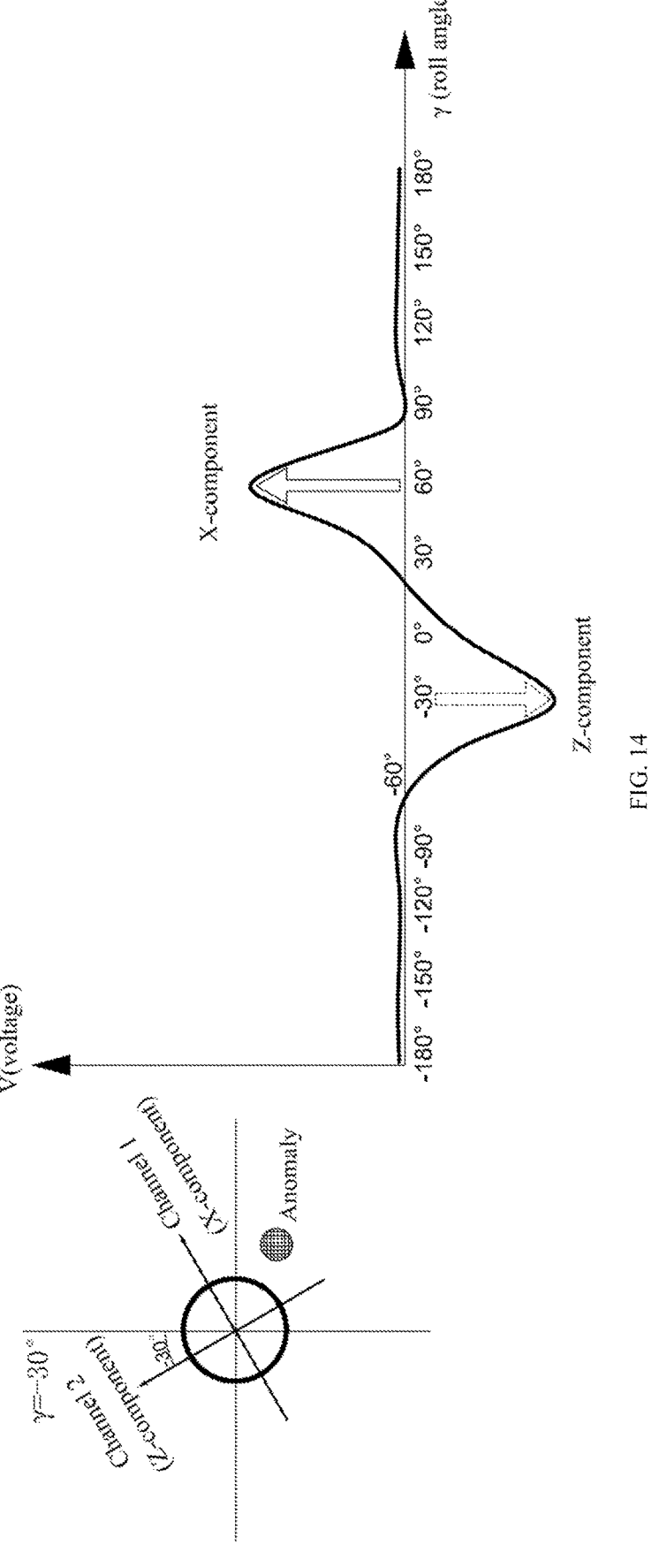
FIG. 14 is a diagram of an original induced electromotive force curve pattern of a secondary field at a fourth measuring point according to an embodiment of the present disclosure.
Figure 15:
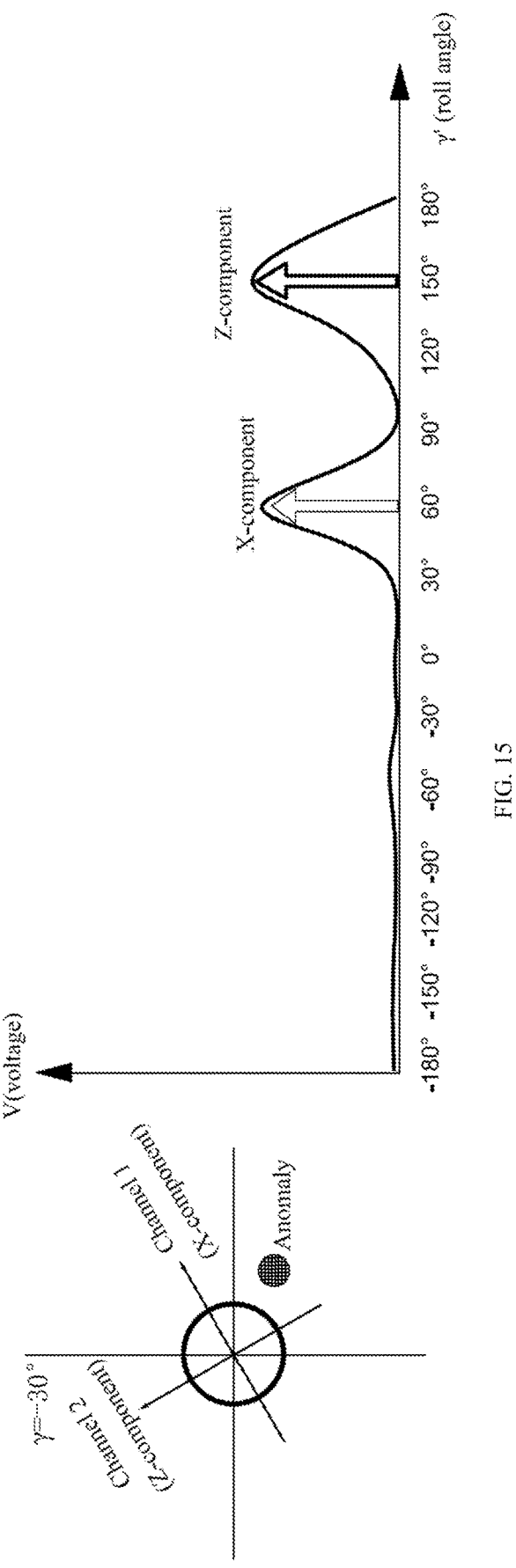
FIG. 15 is an unwrapped diagram based on a transformed roll angle of the fourth measuring point according to an embodiment of the present disclosure.

The anomaly is located on the positive axis of the X-component and the negative axis of the Z-component, and the corresponding pattern of the original induced electromotive force curve of the secondary field is shown in FIG. 14. In this case, the measured signal of the X-component is positive and does not require any transformation. The measured signal of the Z-component is negative, and the roll angle is $\gamma=-30°$. According to the roll angle transformation equation, the transformed roll angle of the Z-component is $\gamma'=-30°+180°=150°$, and The unwrapped diagram based on the transformed roll angle is shown in FIG. 15.

(5) Fifth Measuring Point (the Anomaly is Located on the Negative Axis of the X-Component and the Positive Axis of the Z-Component)

Figure 16:
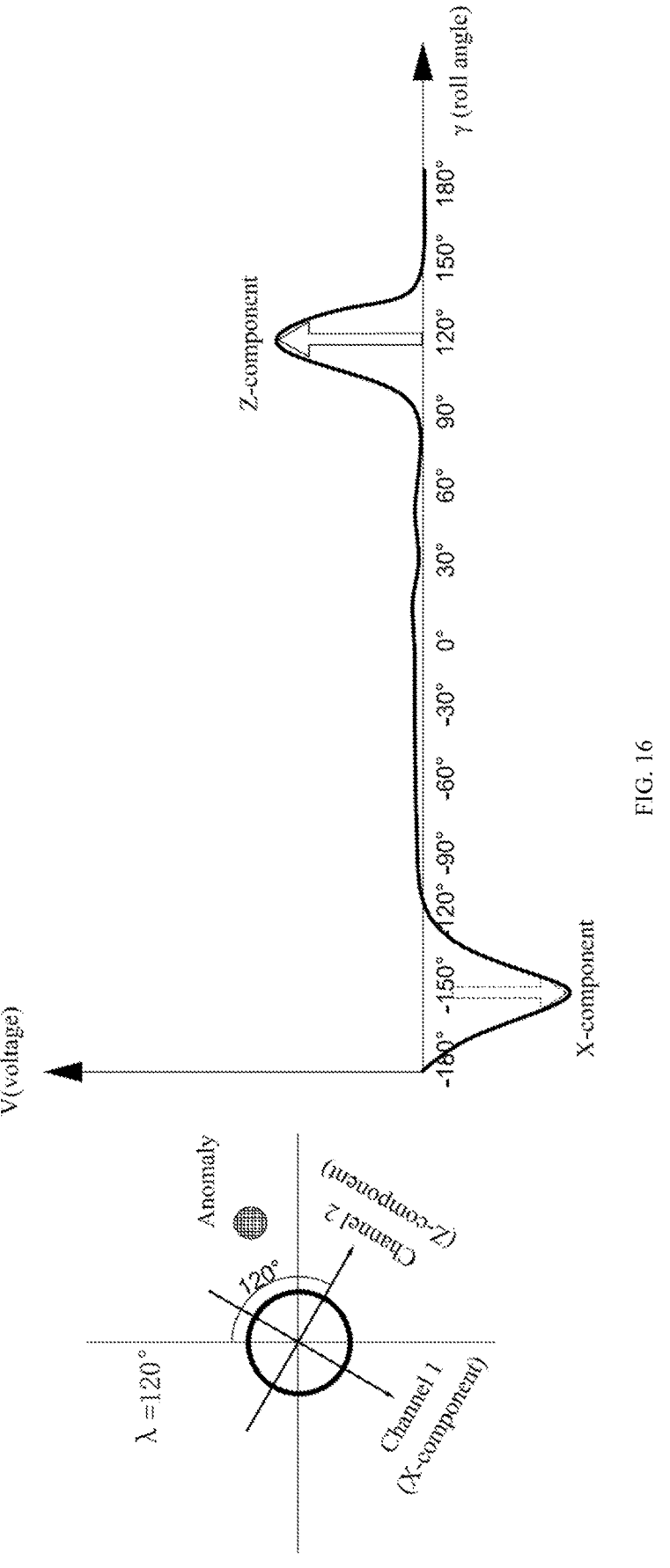
FIG. 16 is a diagram of an original induced electromotive force curve pattern of a secondary field at a fifth measuring point according to an embodiment of the present disclosure.
Figure 17:
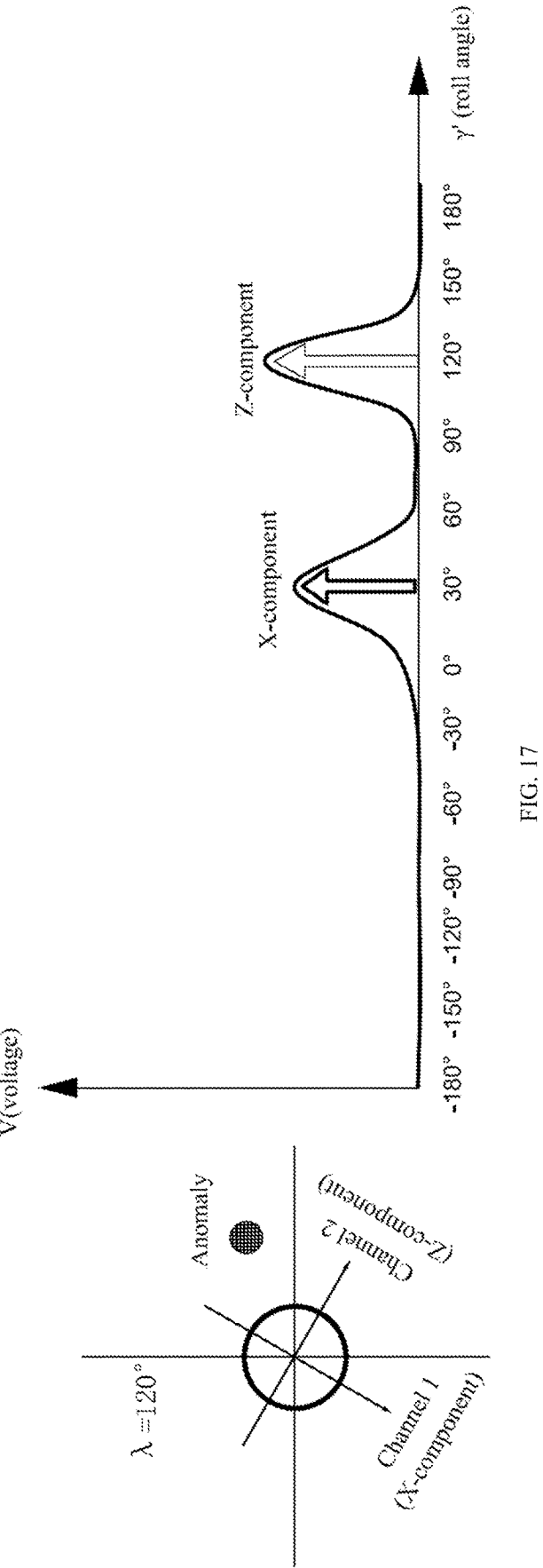
FIG. 17 is an unwrapped diagram based on a transformed roll angle of the fifth measuring point according to an embodiment of the present disclosure.

The anomaly is located on the negative axis of the X-component and the positive axis of the Z-component, and the corresponding pattern of the original induced electromotive force curve of the secondary field is shown in FIG. 16. In this case, the measured signal of the Z-component is positive and does not require any transformation. The measured signal of the X-component is negative, and the roll angle is $\gamma=-120°$. According to the roll angle transformation equation, the transformed roll angle of the X-component is $\gamma'=-150°+180°=30°$, and The unwrapped diagram based on the transformed roll angle is shown in FIG. 17.

Figure 18:
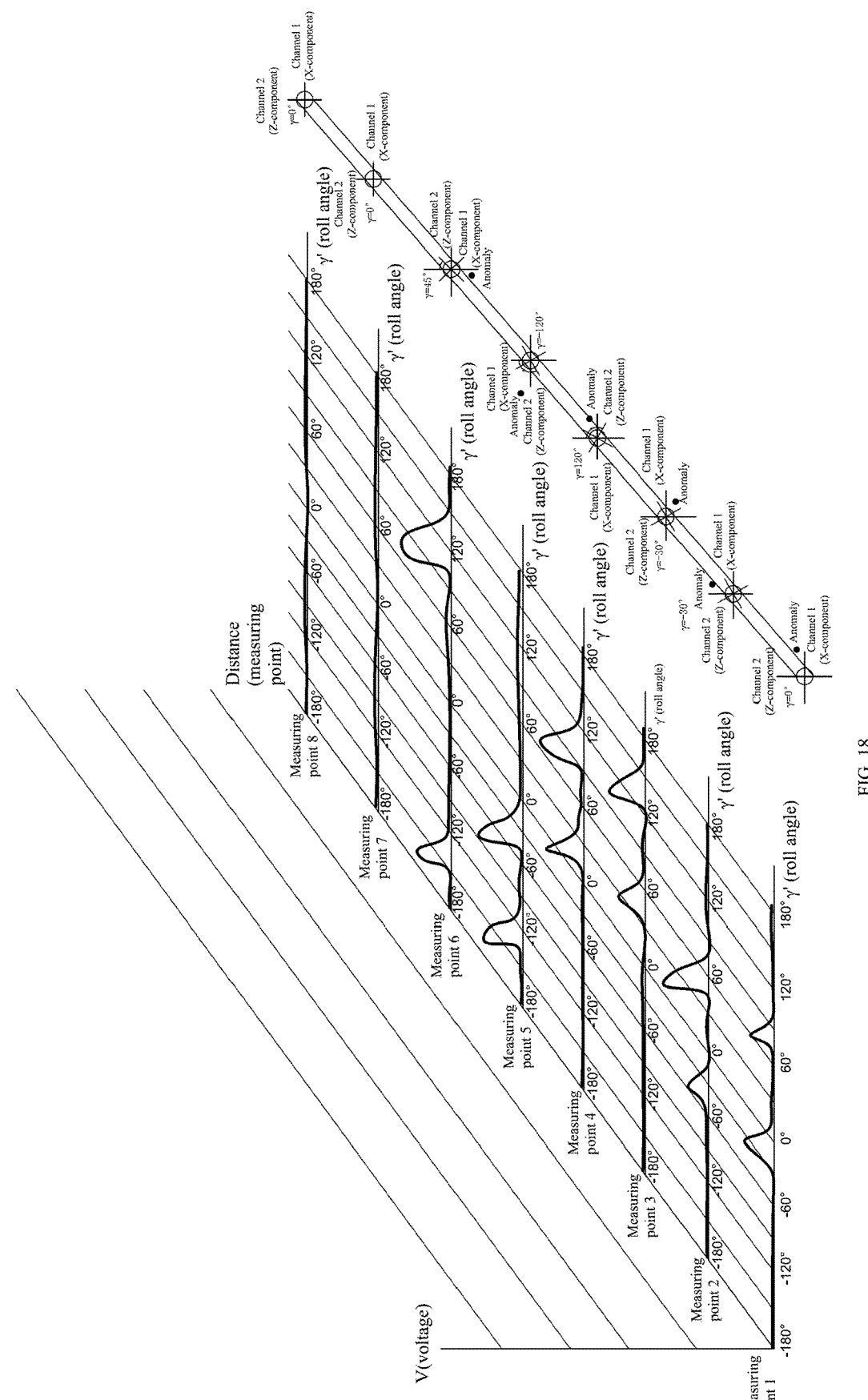
FIG. 18 is a three-dimensional spatial distribution map of all measuring points according to an embodiment of the present disclosure.

It should be noted that any of the above measuring points is understood as a measuring point at a certain depth in the borehole (processed in this way for each measuring point). On this basis, a three-dimensional rectangular coordinate system is established, and all measuring points are combined together with a fixed drilling footage to acquire the three-dimensional spatial distribution map shown in FIG. 18. In the coordinate system, the X-axis (horizontal axis) represents the transformed roll angle, the Y-axis (longitudinal axis) represents the hole depth or actual drilling footage, and the Z-axis (vertical axis) represents the induced electromotive force value. Through the three-dimensional interpolation calculation, the three-dimensional electromotive force data after unwrapping of the borehole in a roll angle manner are acquired.

Furthermore, after the three-dimensional electromotive force data are acquired, the two-dimensional resistivity profile data of all the measuring points are acquired by a known resistivity calculation method, such as a late stage resistivity calculation equation or other methods. A three-dimensional resistivity data volume centered on the borehole is acquired through three-dimensional interpolation calculation. Specifically, the step S42 that based on the three-dimensional electromotive force data, the orientation and distance of the anomalous body are determined includes the following steps.

Two-dimensional and three-dimensional spatial distributions of resistivity are acquired for all the measuring points by a known resistivity calculation method, and a three-dimensional resistivity data volume centered on the borehole is calculated.

A two-dimensional resistivity value profile is extracted from the three-dimensional resistivity data volume at any roll angle.

Based on the two-dimensional resistivity value profile, a geological condition of the target borehole at any specified orientation and any specified distance is determined.

Figure 19:
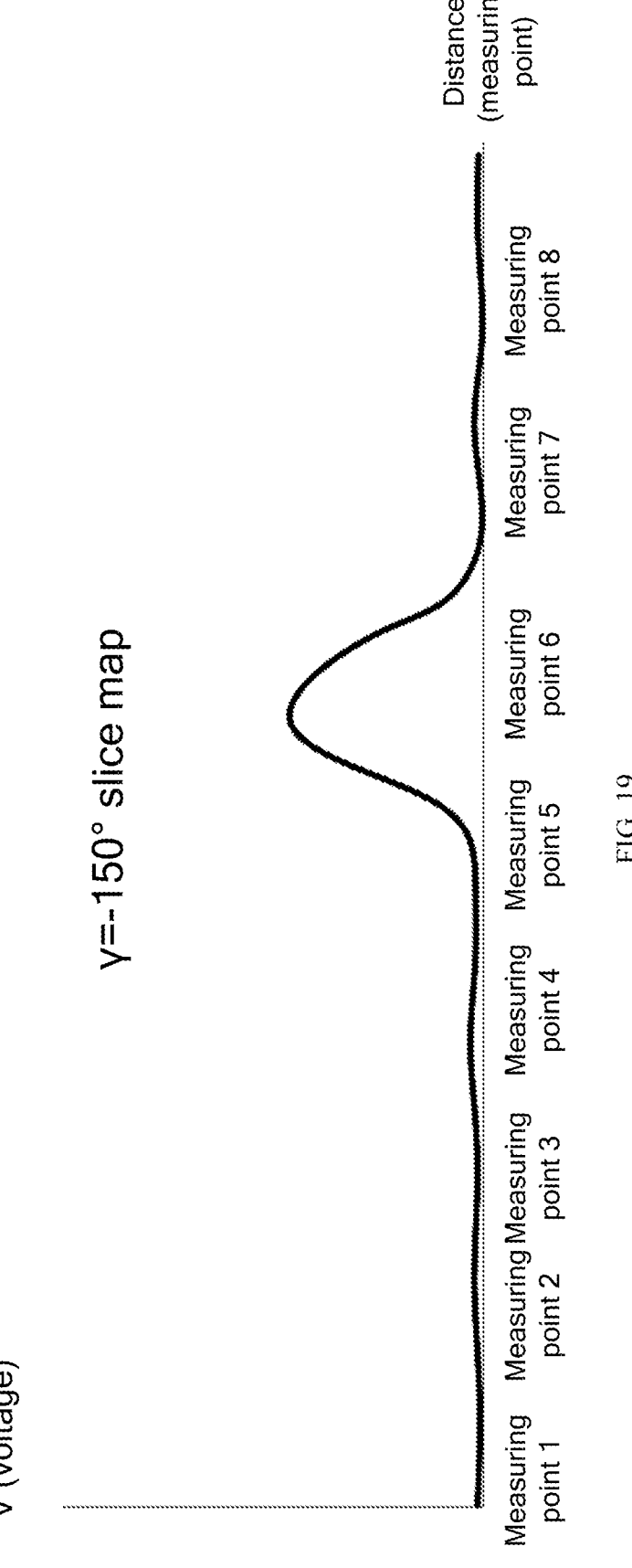
FIG. 19 is a two-dimensional slice map of a borehole extracted at a roll angle of −150° according to an embodiment of the present disclosure.
Figure 20:
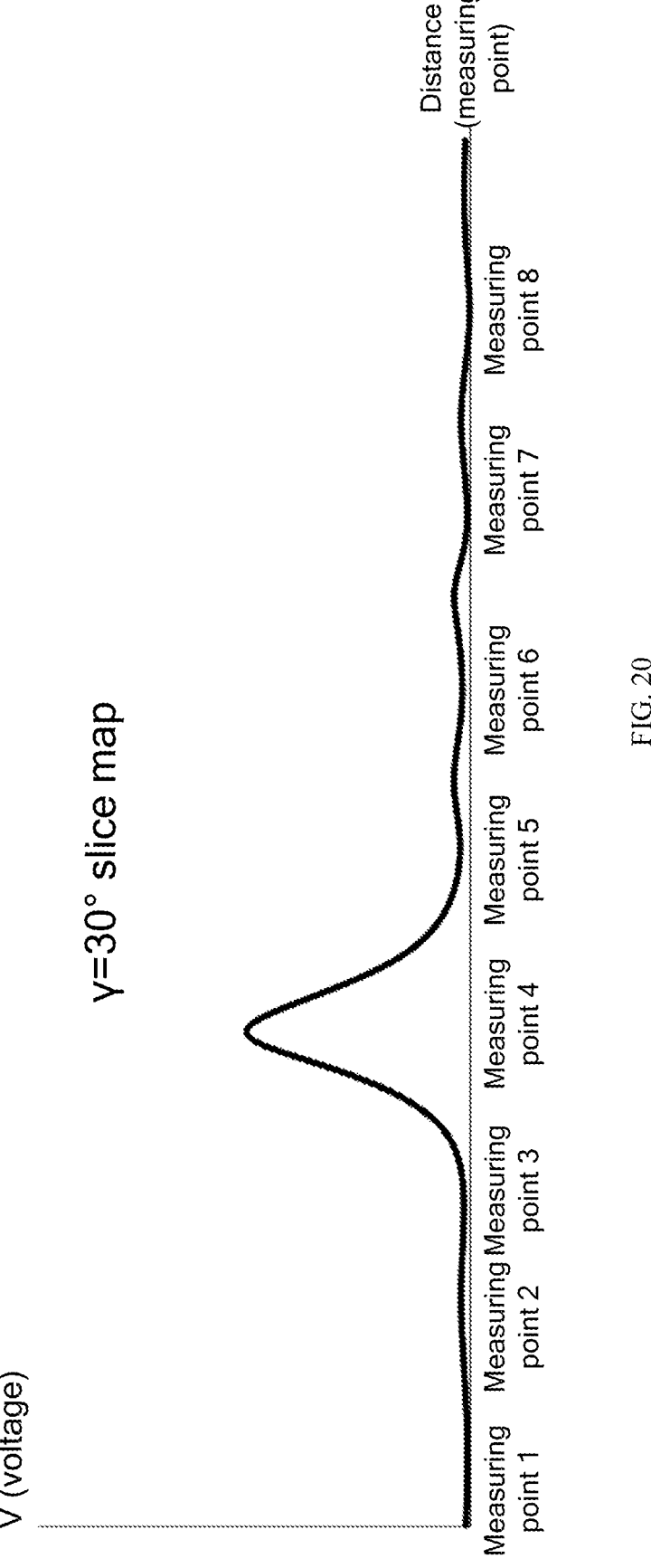
FIG. 20 is a two-dimensional slice map of a borehole extracted at a roll angle of 30° according to an embodiment of the present disclosure.
Figure 21:
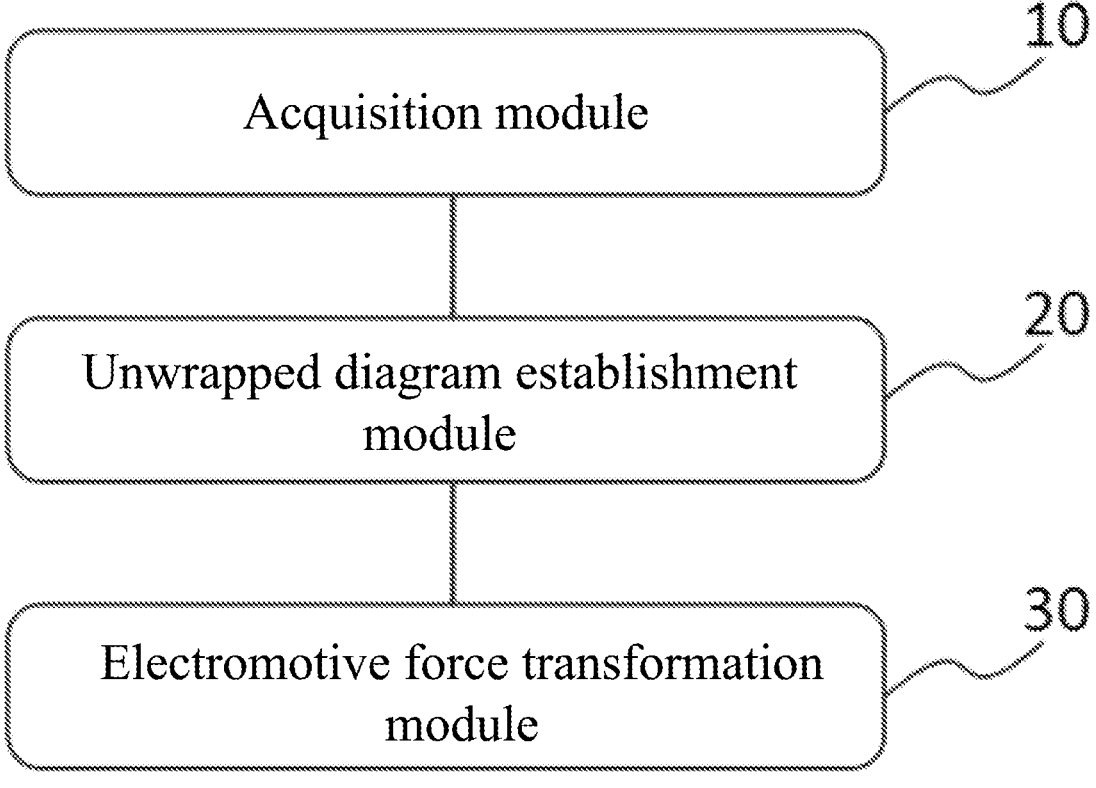
FIG. 21 is a structural schematic diagram of a three-dimensional unwrapping processing system for a borehole transient electromagnetic method according to an embodiment of the present disclosure.

As shown in FIGS. 19 and 20, two-dimensional slice maps are extracted at the $-150°$ and $30°$ roll angles of the borehole, respectively, to reflect the geological conditions of the lower left and upper right sides of the borehole.

It should be noted that in this embodiment, a two-dimensional resistivity value profile is extracted at any roll angle. The roll angle refers to the actual orientation of the borehole, the X-axis (horizontal axis) represents the measuring point-depth information, and the Y-axis (longitudinal axis) represents the measured induced electromotive force value. At this point, the orientation of the anomalous body around the borehole can be accurately determined.

It should be noted that for anomalous bodies of the same scale, a greater induced electromotive force indicates that the anomalous body is closer to the detection device, and the corresponding calculated value of the late stage resistivity will be smaller. A smaller induced electromotive force indicates that the anomalous body is farther from the detection device, and the corresponding calculated value of the late stage resistivity will be larger. The distance from the anomalous body to the detection device can be expressed by the equation for calculating the late stage resistivity value:

$$\rho_\tau(t) = \frac{\mu_0}{4\pi t}\left(\frac{2\mu_0 M}{5t\frac{dB_z(t)}{dt}}\right)$$

In the equation, $$\frac{dB_z(t)}{dt}$$

is the induced electromotive force value, $\mu_0$ is the magnetic permeability in vacuum, t is the propagation time, and M is the transmission magnetic moment. It can be seen that the late stage resistivity value is inversely proportional to the induced electromotive force value.

In addition, as shown in FIG. 17, a second embodiment of the present disclosure further proposes a three-dimensional unwrapping processing system for a borehole transient electromagnetic method, including: an acquisition module, an unwrapped diagram establishment module, and an electromotive force transformation module.

The acquisition module 10 is configured to acquire measurement information of each measuring point in a target borehole, where the measurement information includes a secondary field induced electromotive force and a roll angle. The unwrapped diagram establishment module 20 is configured to establish, for each measuring point, an unwrapped diagram with the roll angle as a horizontal coordinate and the secondary field induced electromotive force as a longitudinal coordinate.

The electromotive force transformation module 30 is configured to transform, when an electromotive force signal in the unwrapped diagram is a negative response, the electromotive force signal into a positive response according to the roll angle to acquire measurement transformation information of each measuring point.

In this embodiment, the negative electromotive force signal is transformed into a positive electromotive force signal, which is combined with an originally positive electromotive force signal to determine the orientation of the anomalous body and the distance from the detection device. By unwrapping the borehole based on the roll angle, the present disclosure fundamentally solves the problem of detecting a negative induced electromotive force response through the borehole transient electromagnetic method. Therefore, the present disclosure can achieve full and effective utilization of negative electromotive force signals.

In an embodiment, the acquisition module 10 is specifically configured to conduct, in a process of moving a transient electromagnetic detection device into and/or out of the target borehole through a push rod, a point measurement according to a set step distance to acquire the measurement information of each measuring point.

In an embodiment, the acquisition module 10 is specifically further configured to rotate, when the transient electromagnetic detection device is pushed to a certain measuring point through the push rod, the transient electromagnetic detection device to measure lateral information of the borehole at the measuring point.

In an embodiment, the system further includes a calibration module, including: a first coordinate system establishment unit, a setting unit, a measurement unit, and a calibration unit. The first coordinate system establishment unit is configured to establish a first coordinate system with the roll angle $\gamma$ at 0°, 90° on a right side and −90° on a left side, and with the transient electromagnetic detection device vertically pointing upward to 0° and vertically pointing downward to +−180°.

The setting unit is configured to set a first receiving coil to be perpendicular to an axial direction of the transient electromagnetic detection device along a horizontal plane and to a right direction to face a positive direction of an X-axis of the first coordinate system, and set a second receiving coil to be perpendicular to the horizontal plane and to an upward direction to face a positive direction of a Z-axis of the first coordinate system.

The measurement unit is configured to place an iron object as a known anomalous body in any quadrant of the first coordinate system, and measure an X-component induced electromotive force and a Z-component induced electromotive force through the first receiving coil and the second receiving coil, respectively.

The calibration unit is configured to adjust, when the X-component induced electromotive force and/or the Z-component induced electromotive force do not match the quadrant, a direction of the X-component and/or a direction of the Z-component such that the direction of the induced electromotive force matches the quadrant.

In an embodiment, the electromotive force transformation module 30 is specifically configured to perform following steps.

When an electromotive force signal of a component in the unwrapped diagram is a negative response, the roll angle is transformed, thereby transforming the electromotive force signal that is a negative response into a positive response, where the transformation equation of the roll angle is:

$$\text{when } 0° < \gamma < 180°, \gamma' = \gamma - 180°$$

$$\text{when } -180° < \gamma < 0°, \gamma' = 180° + \gamma$$

where, $\gamma$ denotes a measured roll angle, and $\gamma'$ denotes a transformed roll angle.

In an embodiment, the system further includes a region division and interpolation module, specifically configured to perform following steps.

The induced electromotive force signal that is a positive response is divided into a high-voltage region and a low-voltage region.

The high-voltage region and the low-voltage region are interpolated separately, and a plurality of measuring points within the corresponding region are smoothly connected to form a plurality of channel curves.

In an embodiment, the system further includes determination module 40, configured to determine, based on the measurement transformation information of all the measuring points, the orientation and distance of the anomalous body.

Specifically, the determination module 40 includes: a three-dimensional data volume forming unit and a determination unit.

The three-dimensional data volume forming unit is configured to form, based on the measurement transformation information of all the measuring points, three-dimensional electromotive force data centered on the borehole.

The determination unit is configured to determine, based on the three-dimensional electromotive force data, the orientation and distance of the anomalous body.

In an embodiment, the three-dimensional data volume forming unit is specifically configured to perform following steps.

A second coordinate system is established by defining an X-axis, a Y-axis, and a Z-axis in a first coordinate system as a transformed roll angle $\gamma'$, a hole depth or actual drilling footage, and an induced electromotive force value, respectively.

In the second coordinate system, the measurement transformation information of all the measuring points is combined along a depth direction of the target borehole at a set interval to acquire the three-dimensional electromotive force data of the target borehole unwrapped based on the roll angle.

In an embodiment, the determination unit is specifically configured to perform following steps.

Two-dimensional and three-dimensional spatial distributions of resistivity are acquired for all the measuring points by a known resistivity calculation method, and a three-dimensional resistivity data volume centered on the borehole is calculated.

A two-dimensional resistivity value profile is extracted from the three-dimensional resistivity data volume at any specified roll angle.

Based on the two-dimensional resistivity value profile, a geological condition of the target borehole at any specified orientation and any specified distance is determined.

It should be noted that although this embodiment does not consider the spatial orientation of the borehole, spatial positioning can be achieved based on information such as inclination, azimuth, and depth of the borehole.

It should be noted that other embodiments or implementation methods of the three-dimensional unwrapping processing system for a borehole transient electromagnetic method described in the present disclosure can refer to the above-mentioned method embodiments, and will not be repeated herein.

In this specification, descriptions of reference terms such as "one embodiment", "some embodiments", "an example", "a specific example", and "some examples" indicate that specific features, structures, materials, or characteristics described in combination with the embodiment(s) or example(s) are included in at least one embodiment or example of the present disclosure. In this specification, the schematic representations of the above terms do not necessarily refer to the same embodiment or example. In addition, the specific features, structures, materials, or characteristics described may be combined in any suitable manner in any one or more embodiments or examples.

Moreover, the terms such as "first" and "second" are used only for the purpose of description and should not be construed as indicating or implying a relative importance, or implicitly indicating a quantity of indicated technical features. Therefore, a feature limited by "first" or "second" may explicitly or implicitly include at least one such feature. In the descriptions about the present disclosure, "a plurality of" means at least two, for example, two or three, unless otherwise specifically limited.

Although the embodiments of the present disclosure have been illustrated and described above, it will be appreciated that the above embodiments are illustrative and should not be construed as limiting the present disclosure. Changes, modifications, substitutions, and variations can be made to the above embodiments by a person of ordinary skill in the art within the scope of the present disclosure.

What is claimed is:

1. A three-dimensional unwrapping processing method for a borehole transient electromagnetic method, comprising:
acquiring measurement information of each measuring point in a target borehole, wherein the measurement information comprises a secondary field induced electromotive force and a roll angle;
establishing, for each measuring point, an unwrapped diagram with the roll angle as a horizontal coordinate and the secondary field induced electromotive force as a longitudinal coordinate; and
transforming, when an electromotive force signal in the unwrapped diagram is a negative response, the electromotive force signal into a positive response according to a transformation equation of the roll angle to acquire measurement transformation information of each measuring point,
wherein the acquiring the measurement information of each measuring point in the target borehole comprises:
conducting, in a process of moving a transient electromagnetic detection device into and/or out of the target borehole through a push rod, a point measurement according to a set step distance to acquire the measurement information of each measuring point.

2. The three-dimensional unwrapping processing method for the borehole transient electromagnetic method according to claim 1, wherein after the transforming, when the electromotive force signal in the unwrapped diagram is the negative response, the electromotive force signal into the positive response according to the transformation equation of the roll angle to acquire the measurement transformation information of each measuring point, the method further comprises: determining an orientation and a distance of an anomalous body based on the measurement transformation information of all measuring points, specifically comprising:
forming, based on the measurement transformation information of all the measuring points, three-dimensional electromotive force data centered on the borehole; and
determining, based on the three-dimensional electromotive force data, the orientation and the distance of the anomalous body.

3. The three-dimensional unwrapping processing method for the borehole transient electromagnetic method according to claim 1, wherein the transient electromagnetic detection device is rotatably connected to the push rod, and the method further comprises:
rotating, when the transient electromagnetic detection device is pushed or withdrawn to a certain measuring point through the push rod, the transient electromagnetic detection device by a specified angle to measure lateral information of the target borehole at the measuring point.

4. The three-dimensional unwrapping processing method for the borehole transient electromagnetic method according to claim 1, wherein before the acquiring the measurement information of each measuring point in the target borehole, the method further comprises:
establishing a first coordinate system with the roll angle $\gamma$ at 0°, 90° on a right side and −90° on a left side, and with a transient electromagnetic detection device vertically pointing upward to 0° and vertically pointing downward to +−180°;
setting a first receiving coil to be perpendicular to an axial direction of the transient electromagnetic detection device along a horizontal plane and to a right direction to face a positive direction of an X-axis of the first coordinate system, and setting a second receiving coil to be perpendicular to the horizontal plane and to an upward direction to face a positive direction of a Z-axis of the first coordinate system;
placing an iron object as a known anomalous body in any quadrant of the first coordinate system, and measuring an X-component induced electromotive force and a Z-component induced electromotive force through the first receiving coil and the second receiving coil, respectively; and
adjusting, when the X-component induced electromotive force and/or the Z-component induced electromotive force do not match the quadrant, a direction of the X-component and/or a direction of the Z-component such that the direction of the induced electromotive force matches the quadrant.

5. The three-dimensional unwrapping processing method for the borehole transient electromagnetic method according to claim 1, wherein the transforming, when the electromotive force signal in the unwrapped diagram is the negative response, the electromotive force signal into the positive response according to the transformation equation of the roll angle to acquire the measurement transformation information of each measuring point comprises:
when an electromotive force signal of a component in the unwrapped diagram is the negative response, transforming the roll angle to transform the electromotive force signal that is the negative response into the positive response, wherein the transformation equation of the roll angle is:

$$\text{when } 0° < \gamma < 180°, \gamma' = \gamma - 180°$$
$$\text{when } -180° < \gamma < 0°, \gamma' = 180° + \gamma$$

wherein, $\gamma$ denotes a measured roll angle, and $\gamma'$ denotes a transformed roll angle.

6. The three-dimensional unwrapping processing method for the borehole transient electromagnetic method according to claim 5, wherein for processing an induced electromotive force signal that is the positive response, the method further comprises:

dividing the induced electromotive force signal that is the positive response into a high-voltage region and a low-voltage region; and interpolating the high-voltage region and the low-voltage region separately, and smoothly connecting a plurality of measuring points within the corresponding region to form a plurality of channel curves.

7. The three-dimensional unwrapping processing method for the borehole transient electromagnetic method according to claim 2, wherein the determining, based on the three-dimensional electromotive force data, the orientation and the distance of the anomalous body comprises:

processing, based on a known resistivity calculation method, the three-dimensional electromotive force data to acquire two-dimensional and three-dimensional spatial distributions of resistivity for all the measuring points, and calculating a three-dimensional resistivity data volume centered on the borehole;

extracting a two-dimensional resistivity value profile from the three-dimensional resistivity data volume at any specified roll angle; and determining, based on the two-dimensional resistivity value profile, a geological condition of the target borehole at any specified orientation and any specified distance.

8. The three-dimensional unwrapping processing method for the borehole transient electromagnetic method according to claim 2, wherein the forming, based on the measurement transformation information of all the measuring points, the three-dimensional electromotive force data centered on the borehole comprises:

establishing a second coordinate system by defining an X-axis, a Y-axis and a Z-axis in a first coordinate system as a transformed roll angle $\gamma'$, a hole depth or actual drilling footage and an induced electromotive force value, respectively; and combining, in the second coordinate system, the measurement transformation information of all the measuring points along a depth direction of the target borehole at a set interval to acquire the three-dimensional electromotive force data of the target borehole unwrapped based on the roll angle.

\* \* \* \* \*